United States Patent [19]

Nakamura et al.

[11] Patent Number: 5,768,095
[45] Date of Patent: Jun. 16, 1998

[54] PORTABLE COMPUTER HAVING OVERHEAD PROJECTION CAPABILITY AND BACK LID PORTION WITH SWITCH CONTROLLING BACKLIGHT

[75] Inventors: Fusanobu Nakamura, Yamato; Tomoyuki Takahashi, Fujisawa, both of Japan

[73] Assignee: International Business Machines Corp., Armonk, N.Y.

[21] Appl. No.: 610,649

[22] Filed: Mar. 4, 1996

[30] Foreign Application Priority Data

Mar. 3, 1995 [JP] Japan .................. 7-043851

[51] Int. Cl.⁶ .......................... G06F 1/16; G02F 1/1335
[52] U.S. Cl. .......................... 361/681; 349/6; 349/64
[58] Field of Search ............... 364/708.1, 231, 364/231.1, 231.2, 231.3; 353/122, DIG. 3; 361/681; 349/6, 64, 65

[56] References Cited

U.S. PATENT DOCUMENTS

| 5,041,965 | 8/1991 | Chen ................. | 353/122 X |
| 5,353,075 | 10/1994 | Conner et al. .......... | 353/122 |
| 5,593,221 | 1/1997 | Evanicky et al. ........ | 353/122 |

FOREIGN PATENT DOCUMENTS

| 4019755 | 1/1992 | Germany . |
| 64121 | 1/1989 | Japan . |
| 6425221 | 1/1989 | Japan . |
| 31184 | 1/1991 | Japan . |
| 3282441 | 12/1991 | Japan . |
| 416824 | 1/1992 | Japan . |
| 546271 | 2/1993 | Japan . |
| 550428 | 7/1993 | Japan . |

*Primary Examiner*—Michael W. Phillips
*Attorney, Agent, or Firm*—Martin J. McKinley

[57] ABSTRACT

A portable computer is adapted for use with an overhead projector and includes a main body having a keyboard on its upper face and a lid, which is hinged to the rear edge of the main body. The lid includes front and back portions. The front lid portion includes a liquid crystal display, a driver for the display, and a backlight. The back lid portion includes a light diffuser that diffuses light emitted by the backlight. The back lid portion is connected to the front lid portion by a latch, which is only accessible to the user when the lid is in the open position, thereby preventing the inadvertent removal of the back lid portion when the lid is closed against the main body. A switch is also provided that detects the removal of the back lid portion and cuts off the drive current to the backlight in the front lid portion. Since the backlight consumes a considerable amount of battery current, the switch prevents unnecessary battery drainage by automatically switching off power to the backlight anytime the computer is configured in the overhead projection mode, i.e., anytime the back lid portion has been removed.

1 Claim, 22 Drawing Sheets

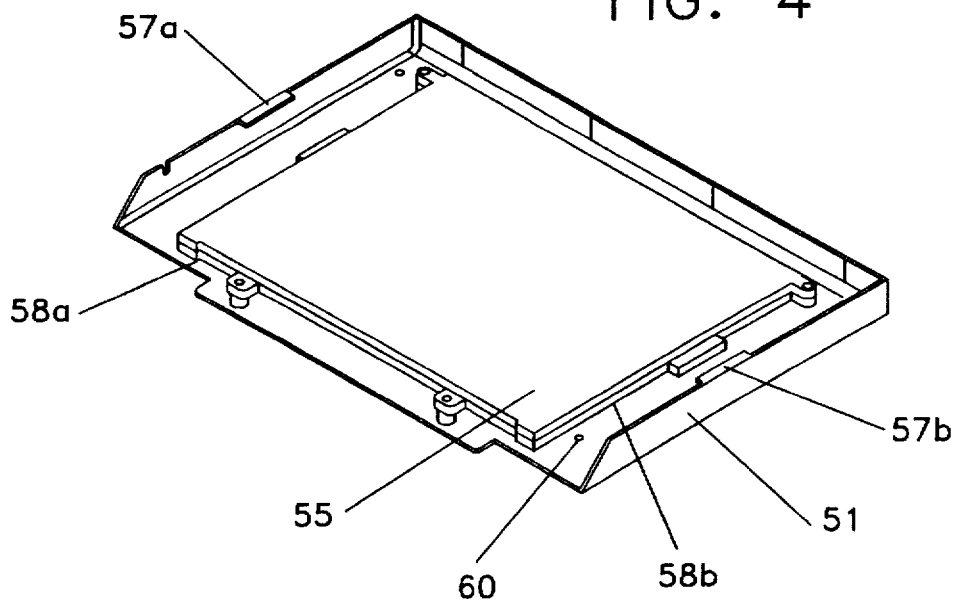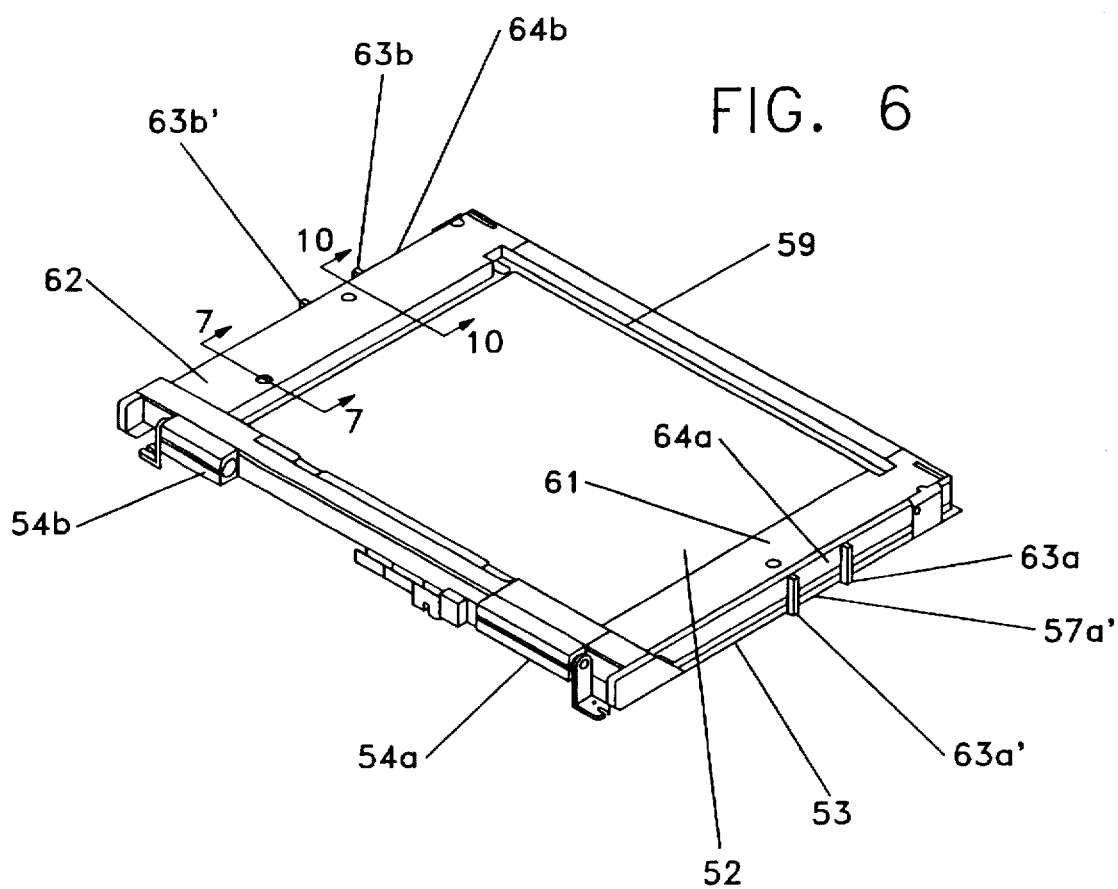

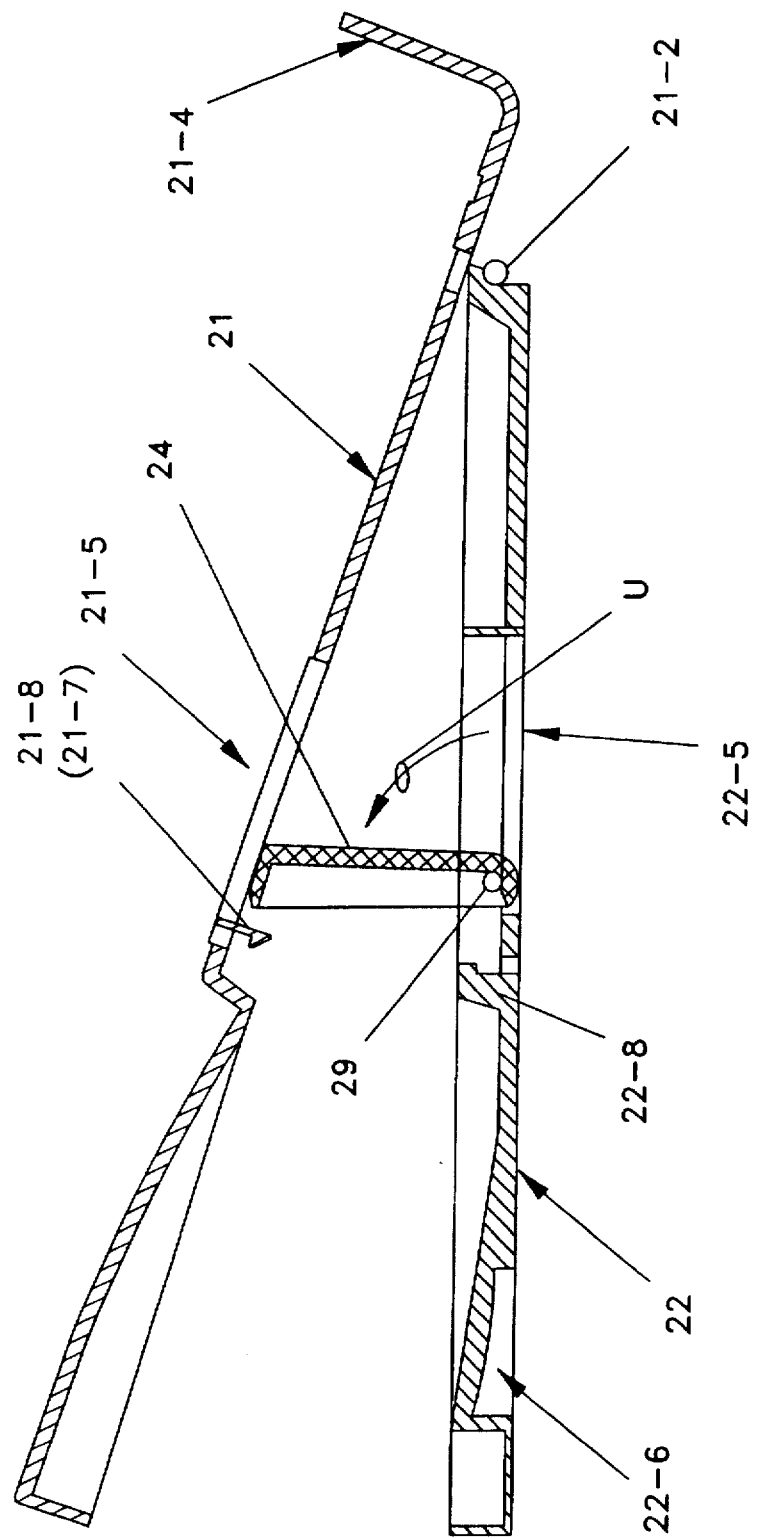

PORTABLE COMPUTER HAVING OVERHEAD PROJECTION CAPABILITY AND BACK LID PORTION WITH SWITCH CONTROLLING BACKLIGHT

BACKGROUND OF THE INVENTION

Applicants claim the foreign priority benefits under 35 U.S.C. 119 of Japanese Application no. 7-043851 filed Mar. 3, 1995. This Japanese Application and its translation are incorporated into this Application by reference.

This invention pertains to computers and other data processing apparatus and, move particulary, to a portable comupter having a display screen that is useable as a photo-transparency, such that an image displayed on the display screen can be enlarged and projected onto a screen by an overhead projector.

A prior art notebook computer 1 which is similar to the IBM ThinkPad® 755CE/755CSE/755CD, notebook computer 1, includes a thin main body 10 and a lid 50 that is hinged to the main body so that the lid can be freely opened and closed.

The main body 10 has a shallow case 11 and a keyboard 12. A system board which is incorporated into the case 11 and is not visible in FIG. 1 includes a CPU, a RAM, ROM, a system bus, an external storage device (such as an HDD or a CD-ROM, and a battery pack. The keyboard 12 forms the upper face of the case 11 and also shields the inside.

The lid 50 includes a shallow rear cover 51, a liquid crystal display (LCD) panel 52, and a front bezel 53 that secures the display panel to the rear cover 51. A pair of tongues 54a and 54b, which have a nearly cylindrical shape, are integrally formed at the lower end of the front bezel 53. As the tongue pieces 54a and 54b are rotably coupled with corresponding portions of the main body 10, the lid 50 is hinged on the main body 10 so as to be rotatable relative to the main body 10. The liquid crystal display panel 52 is a thin display assembly wherein multiple liquid crystal devices are arranged. Since the liquid crystal display panel 52 does not itself emit light, a back light (not shown), which lights the display, and a light diffusion plate (not shown), which diffuses light emitted from the back light and provides a uniform light intensity over the whole screen, are provided on the reverse face of the display panel 52. Drivers (not shown) along the X axis and the Y axis drive the liquid crystal display panel 52 and are shielded by the front bezel 53 and the rear over 51.

An appropriately equipped notebook computer can be used, with an overhead projector, to project and enlarge images on a screen. In this case, members on the reverse side of the liquid crystal display panel (the rear cover and the light diffusion plate) are removed to permit the transmission of light through the LCD, and, in place of a projection transparency, the liquid crystal display panel is mounted on the overhead projector (OHP) such that an enlarged image of the display screen can be directly projected onto a screen.

There are several advantages derived from the use of a notebook computer with an OHP device.

To begin, a projection transparacy is not required. In addition, as the contents of the display can be edited through the use of the, keyboard and mouse, the display contents can be constantly updated (added to, deleted, or corrected) during a presentation.

Further, since the display contents are ordinarily stored in the memory of the computer or in an external storage device, such as floppy disk drive an extremely large number of display screen images can be compactly stored in one easy to cary notebook computer.

Since the image displayed on a liquid crystal display panel can be easily scrolled, or a new image can be displayed by a simple keystroke changes to the display image are easily accomplised. Further, since the display is controlled by the computer, the order in which images are to be displayed can be easily arranged prior to the presentation, and will not be mixed up during the presentation, as frequently occurs with photo transparencies.

There are many obvious advantages to the use of a computer driven liquid crystal display as a projection transparency.

However, to adapt a notebook computer to work with an OHP device, it is necessary to solve several problems.

One problem concerns the mounting of a liquid crystal display panel on an OHP.

In Japanese Unexamined Utility Model Publication No. Sho 64-121, a lid is disclosed that includes a liquid crystal display panel that can be detached the at hinge from the main body of a notebook computer, so that it is possible to mount only the lid on an OHP. In Japanese Unexamined Patent Publication No. Hei 03-1184, a design is disclosed that permits the removal of the liquid crystal display panel from the lid, which is retained in place, so that the LCD panel can be mounted on an OHP. Further, in Japanese Unexamined Patent Publication No. Hei 03-282441, a design is disclosed that, instead of permitting the removal of the liquid crystal display panel from the computer, provides for the mounting of an expansion liquid crystal display panel OHP.

In either of these publications only the flat liquid crystal display panel is mounted over the OHP light source, since the center of gravity of the LCD Panel is close to and centered over the OHP, these systems are comparatively stable, and there is no fear of the panel falling off the OHP.

However, when the liquid crystal display panels are separated from the main body of the computer, the cables that carry the RGB signals from the computer to the liquid crystal display panel must be extended and exposed, thereby subjecting the cables and the display to electromagnetic interference (EMI). In addition, in the notebook computer that is disclosed in Japanese Unexamined Utility Model Publication No. Sho 64-121, the detachable hinge must not only support the main body and the cover, but it must also provide a mechanism to pass the cables. Thus, this structure is complicated. And with the design that is described in Japanese Unexamined Patent Publication No. Hei 03-282441, a user would be charged more for the expansion liquid crystal display panel.

In FIG. 4 of German Unexamined Patent Publication No. 4019755, a main body and a liquid crystal display panel are disclosed that are not separated from each other, and that, with the lid opened until it is almost horizontal, are both mounted on an OHP. The problems that arise from the removal of a liquid crystal display panel and the extension of RGB signal lines can thereby be eliminated. Many OHP devices that are currently available on the market, however, do not have a large enough foot print to support both a liquid crystal display panel and a keyboard (main body). Thus, this design is only easily useable with an OHP that is built into a table such that the upper surface of the table is flush with the upper surface of the table is flush with the upper surface of the light source.

Also, in Japanese Unexamined Patent Publication No. Hei 04-16824, a design is dislcosed whereby the entire main body of a computer is mounted on an OHP. More specifically, the lid (having a liquid crystal display panel) is opened and positioned perpendicular to the main body, and a recessed portion, which is integrally formed with the main body, engages one end of an OHP. The OHP device disclosed in this publication is used with a special purpose computer, and. The main body (keyboard) of the computer stands upright and interferes with the audience's view of the projection screen.

Another problem is the positioning of the liquid crystal display panel above the OHP light source.

To use a computer with an OHP device, a liquid crystal display panel is set parallel to the glass surface of the OHP light source.

When, the liquid crystal display panel is positioned a short distance above the OHP light source, more light is gathered on the display panel and a brighter image can be projected onto a screen. When the main body and the lid are positioned with the lid open and almost horizontal to the main body, as in German Patent Publication No. 4019755, this positioning is preferable because the liquid crystal display panel is separated from the OHP light source section only by a small distance that is equivalent to the thickness of the main body. However, with a computer model that has a thick main body, the liquid crystal display panel will be positioned too high and outside the focusing range of an OHP light source such that image that is projected onto a screen will be blurred. The ideal height of a liquid crystal display panel relative to an OHP light source is determined by obtaining a balance between the light collection and the focusing range. Through experience, it has been determined that 2 to 3.5 cm is an appropriate height for a liquid crystal display panel that is to be used with many current OHP devices.

Other problems occurs in those cases where liquid crystal display panels are not detachable and the entire computer is mounted on the OHP; specifically, two problems are the radiation of heat from the light source into the main body of the computer and the difficulty of key input operations.

When the liquid crystal display panel is not detachable from the main body and the entire computer is mounted on the OHP light source, the body of the computer is directly exposed to heat radiated from the light source. If an OHP device has a comparatively low power of about 600 W, the heat release from the light source is usually not problematic. However, when a computer is mounted on a 1000 W OHP high light intensity, the computer body will be subjected to temperatures that are much higher than those that are encountered during normal use. As a result, circuits (especially those for a CPU that itself generates heat) on the system board inside the main body may exceed rated limitations.

When a main body is set perpendicular to an OHP light source as is disclosed in Japanese Unexamined Patent Publication No. Hei 04-16824, radiation of heat is not a problem. It is, however, difficult for a presenter to input data during a presentation by using the keys of a keyboard, which is Bet upright. Further, as is mentioned previously, the main body interfere's with the audiences' view.

There is also a proposal that calls for the attaching of a cooling fan to a notebook computer. The addition of devices and other items, however, increases the size of a computer and consideraly increases the cost of the computer.

Still other problems occur when members on the reverse side of a lid are removed, exposing electrically active circuits, such as a backlight, that a user may touch accidentally. Further, when a liquid crystal display panel is employed with an OHP device, it is not necessary for the backlight to be activated and, if it is left on further, the electricity consumed by the back light is merely a waste of power.

SUMMARY OF THE INVENTION

It is one object of the present invention to provide an improved computer or other information processing apparatus that has a liquid crystal diaplay panel that can be used with an overhead projector by using the liquid crystal display panel as a projection transparacy.

It is another object of the present invention to provide an improved computer or other information processing apparatus that can be used with an OHP device while its main body and lid are linked together.

It is an additional object of the present invention to provide an improved computer or other information processing apparatus that can be used with an OHP device without the need for additional devices and items.

It is a further object of the present invention to provide an improved computer or other information processing apparatus that can be employed with an OHP device and that has high useability, durability and safety.

It is still another object of the present invention to provide an improved computer or other information processing apparatus that can be used with OHP devices that are available on the market in a manner that does not cause problems associated with heat from the light source of the OHP being radiated into the body of the computer.

It is a still further object of the present invention to provide an improved computer or other information processing apparatus that can be used with OHP devices that are available on the market in a manner in which data can be easily inputted via keyboard while the computer is installed on the OHP.

Briefly, the invention is a portable information processing apparatus that includes a main body having a keyboard on an upper face and a lid that is hinged rotatably with the main body at a rear edge of the main body. The lid includes a front lid portion, a back lid portion, a latching means for latching the back lid portion to the front lid portion, and switching means for detecting the removal of the back lid portion. A liquid crystal display panel, a driver for driving the liquid crystal display panel, and a backlight are mounted in the front lid portion. A light diffuser for diffusing light emitted by the backlight is mounted in the back lid portion. The latching means is only accessible to the user when the lid is in an open position, thereby inhibiting the removal of the back lid portion when the lid is closed against the main body. The switching means also cuts off a drive current to the backlight in response to the removal of the back lid portion.

Other objects, features, and advantages of the present invention will become apparent by referring to the accompanying drawings during the detailed description of the embodiments of the present invention that is presented later.

BRIEF DESCRIPTION of the DRAWINGS

FIG. 4 is a perspective view of the rear cover 51 detached from the lid 50.

FIG. 6 is a rear perspective view of the front bezel 53.

FIG. 18 is a cross-sectional view of the stand 20 taken along the line 18—18 of FIG. 11A (i.e., in the open state).

FIG. 24 illustrates the cap 23a that can be coupled with the locking mechanism 41a.

DESCRIPTION OF THE PREFERRED EMBODIMENTS

Introduction

Figure 1:
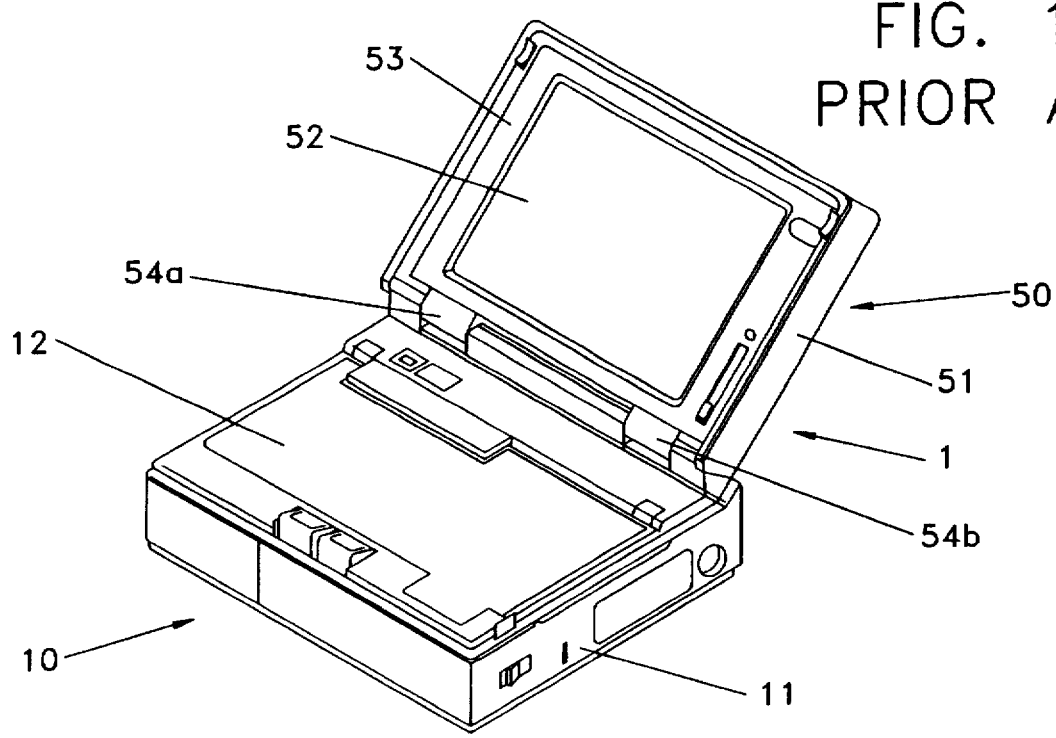
FIG. 1 is a perspective view of the prior art notebook computer.
Figure 2:
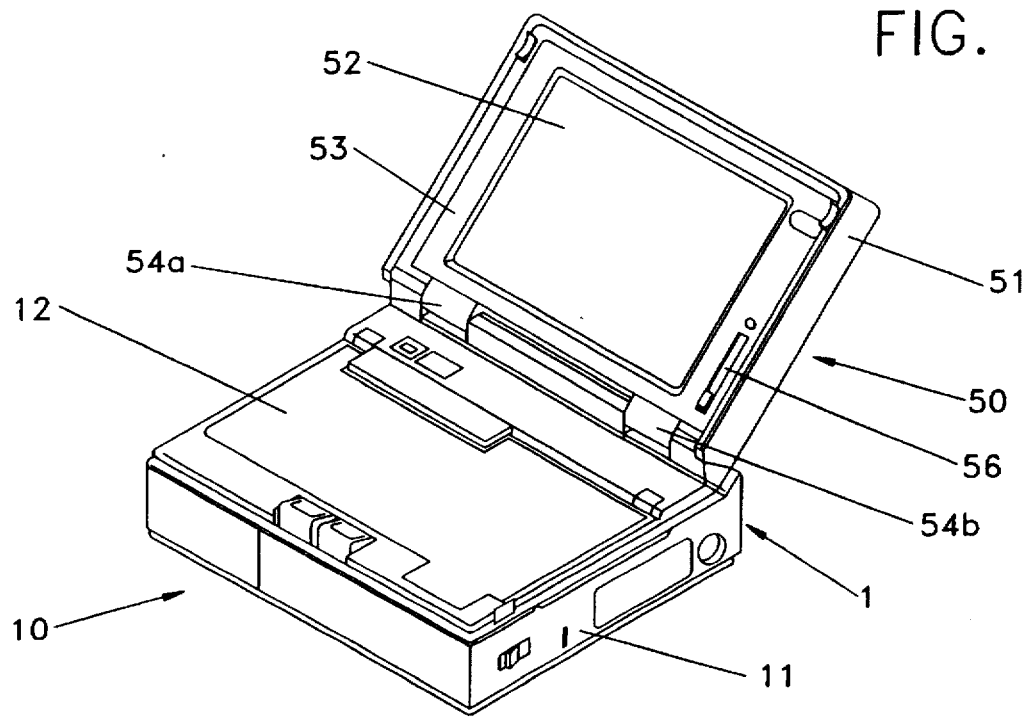
FIG. 2 is a perspective view of a notebook computer of out the present invention.

FIG. 2 is a perspective view (assembly view) of a notebook computer 1 of the present invention. FIG. 2 is almost the same as FIG. 1, which is referred to in the description of the background, except for certain details that will be described later. This means that for the notebook computer 1 of the present invention, most of components can be used in common with a conventional notebook computer. Thus, the use of common components provides a cost advantage in both the development and manufacturing stages.

The main body 10 includes a shallow case 11 and a keyboard 12 case 11 includes an external storage device, such as an HDD or a CD-ROM, a battery pack and, a system board that has a CPU, a RAM, a ROM and a system bus, an external storage device, such as an HDD or a CD-ROM, and a battery pack (none of them shown). The keyboard 12 also forms the upper face of the case 11 and shields the interior.

A lid 50 includes a shallow rear cover 51, a liquid crystal display panel 52, and a front bezel 53 that supports the liquid crystal display panel. A pair of almost cylindrically shaped tongue pieces 54a and 54b are integrally formed at the bottom of the front bezel 53. The lid 50 is rotatably supported at the main body 10 by coupling the tongue pieces 54a and 54b to the corresponding portions of the main body 10 to form a hinge.

Preferably, the display panel 52 is a transparent TFT (Thin Film Transistor) liquid crystal display panel that provide excellent contrast and gray scales. Since the liquid crystal display panel 52 itself does not emit light, a backlight illuminates the display, and a light diffusion plate (both of which will be described later), diffuses the light irradiated by the backlight to provide a uniform intensity overthe whole panel. Both the backlight and the diffusion plate are provided on the reverse side of the liquid crystal display panel 52. The X and Y axis (not shown) drives for the liquid crystal display panel 52 are also included on the inside of the lid 50 and are covered by the front bezel 53 and the rear cover 51. A slide knob 56 is provided at the lower right of the front bezel 53 to adjust the luminance/contrast of the liquid crystal display panel 52.

Lid Arrangement

In FIG. 3 illustrates the procedure required for a user to remove the rear cover 51 from the front bezel 53.

Figure 3A:
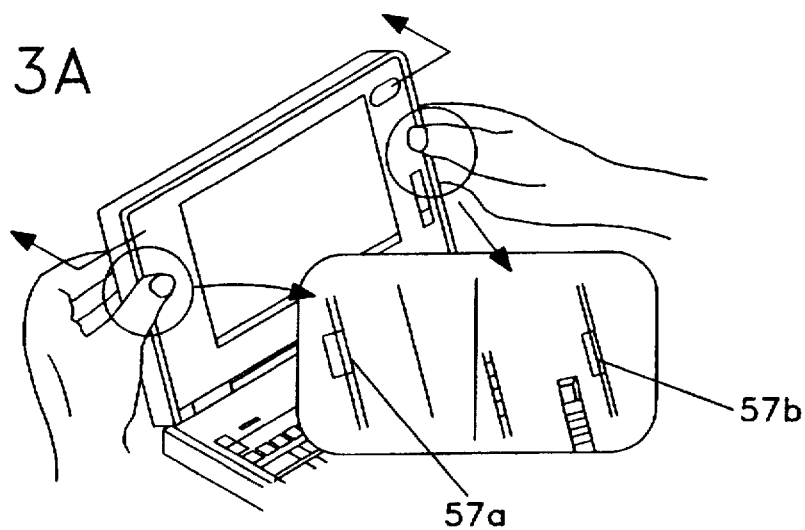
FIGS. 3A and 3B illustrate the steps required for a user to remove the rear cover 51 from the front bezel 53.
Figure 3B:
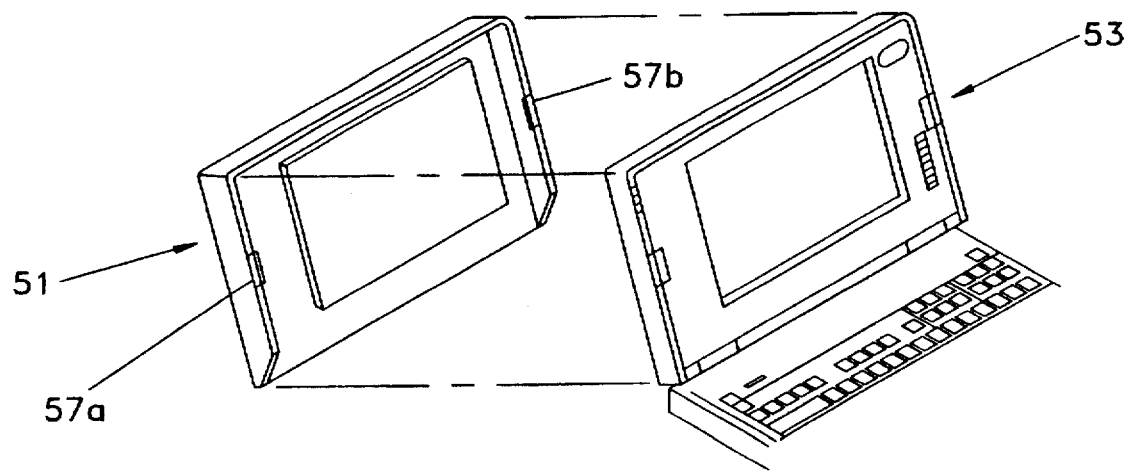

As is shown in FIG. 3A, a user first places his or her thumbs on latches 57a and 57b, which are provided on the side edges of the rear cover 51. Then, the user applies sufficient pressure with this thumbs to force the latches 57a and 57b outward and to disengage them and with additional pressure, to force the rear cover 51 back until it is separates from the front bezel 53. Since the rear cover 51 is integrally formed with the light diffusion plate 55, the liquid crystal display panel 52 after the rear cover 51 has been removed, as is shown in FIG. 3B.

FIG. 4 is a perspective view of the rear cover 51.

Referring to this figure the rear cover 51 is shaped like a shallow box with an open top. The latches 57a and 57b are integrally and symmetrically formed at the top ends of the side walls of the rear cover 51. The light diffusion plate 55 is attached to the bottom of the rear cover 51 by brackets 58a and 58b. The light diffusion plate 55 uniformly diffuses the light irradiated by the backlight 59 onto the liquid crystal display panel 52. The light diffusion plate 55 is formed by laminating acrylic plates that guide irradiated light using multiple sheets that have minute slits on the surface to diffuse light in every direction. A protrusion 60 is formed on the lower right of the bottom of the rear cover 51. The protrusion 60 is provided to detect the attachment and detachment of the rear cover 51; its mechanism and how it functions will be described in detail later.

Figure 5:
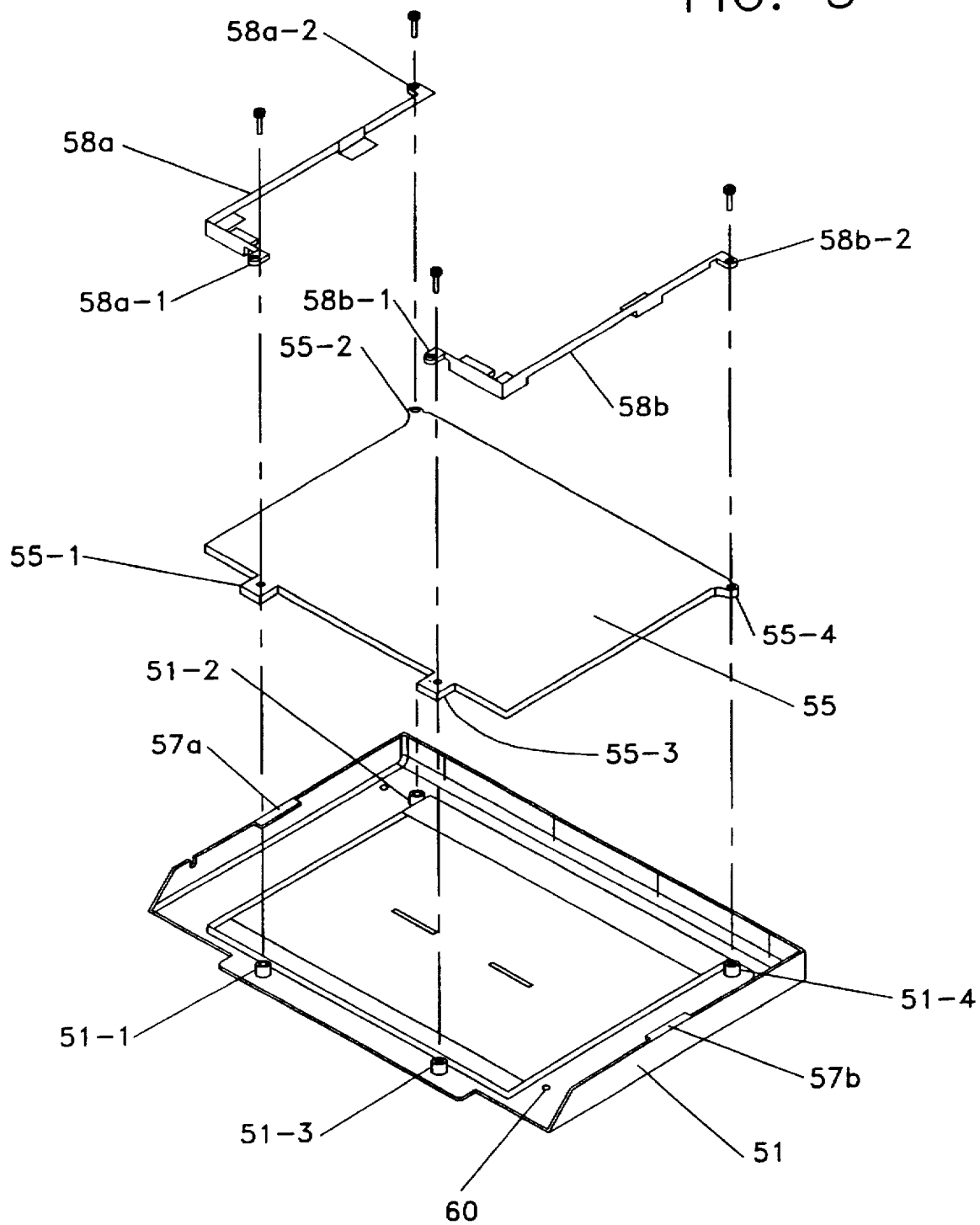
FIG. 5 is an exploded perspective view of the rear cover 51.

FIG. 5 is an exploded perspective view of the rear cover 51. Referring to this figure, the bracket 58a has a tab 58a-1 at one end and a tab 58a-2 at the other, while the bracket 58b has a tab 58b-1 at one end and a tab 58b-2 at the other. Tabs 55-1, 55-2, 55-3, and 55-4 are attached to the side edges of the light diffusion plate 55, and four screw holes 51-1, 51-2, 51-3, 51-4 formed in projections on the bottom face of the rear cover 51. The positions of the holes in the tabs 58a-. . . and 55-1 . . . correspond to those of the screw holes 51-1 . . . on the bottom of the rear cover 51. The light diffusion plate 55 is secured by screws to the bottom of the rear cover 51 while the positions of the individual layers of the plate 55 are adjusted by the brackets 58a and 58b.

As is shown in FIGS. 4 and 5, the rear cover 51 includes only the light diffusion plate 55 and the hardware that is employed to attach the light diffusion plate 55, but does not include any electric components, such as a backlight and drivers. In other words, the removable rear cover 51 is constructed only of inexpensive components that are made of comparatively soft material. Therefore, if the rear cover 51 is dropped accidentally, it will not be damaged. If the rear cover 51 should be broken, no replacement of electric components is required and, thus, the costs of repairs is low. Further, since a signal line for driving the liquid crystal display panel 52, etc., does not have to be extended into rear cover 51, removal of the rear cover is simplified.

FIG. 6 is a rear perspective view of the front bezel 53 of the lid 50 with the rear cover 51 removed. Referring to this figure, the front bezel 53 and a back member 61 are integrally formed (i.e., inseparable). A rectangular opening that measures 10.4 inches diagonally is located almost in the center of the front bezel 53 and the back member 61 in order to expose the display portion of the liquid crystal display panel 52, which is sandwiched between the front bezel 53 and the back member 61. Further, the tongue pieces 54a and 54b, which are cylindrically shaped, are formed at the lower ends of the front bezel 53 and the back member 61 so that they can be coupled to the main body 10.

At a position near the lower left of the back member 61 is a hole 62 into which the protrusion 60 is inserted when the rear cover 51 is attached. An attachment detection mechanism 70 that is mounted inside the hole 62 detects the attachment of the rear cover 51 when the protrusion 60 is inserted into the hole 62 (a procedure that will be described later).

Pairs of ribs 63a and 63a', and 63b and 63b' are provided on the respective sides of the back member 61. When the rear cover 51 is to be attached to, or removed from, the front bezel 53, the ribs 63a and 63a' restrict the movement of the latch 57a and permit it to be shifted only forward and backward. The ribs 63b and 63b' likewise restrict the movement of the latch 57b. Guide faces 64a and 64b, whose end limits are delimited by the pairs of ribs 63a and 63a', and 63b and 63b', respectively, are slightly tapered. Notches 57a' and 57b', which engage the respective latches 57a and 57b, are formed in the side edges of the front bezel 53. The external surface of the back member 61 is almost the same size as the internal surface of the rear cover 51. Therefore, when the rear cover 51 is pushed from the back with the latches 57a and 57b being held in alignment of the ribs 63a and 63b, the latches are guided by the ribs 63a and 63b while sliding across the guide faces 64a and 64b until they finally engage the notches 57a' and 57b'. The attachment of the rear cover 51 is therefore an easy procedure for a user to perform. Further, as is shown in FIG. 3A, after the latches 57a and 57b are forced outward to disengage them from the notches 57a' and 57b', the elasticity of the material forces the latches inward so that they slide across the guide faces 64a and 64b in the direction of the taper (i.e., the direction of removal). Therefore, a user can remove the rear cover 51 very easily.

Figure 7A:
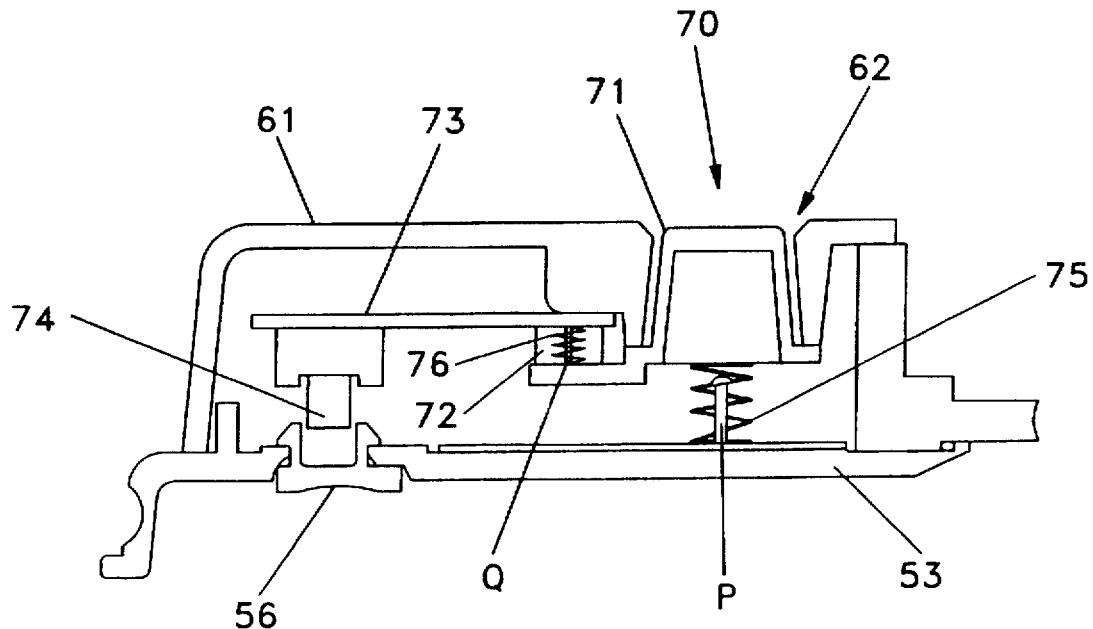
FIGS. 7A and 7B are cross-sectional views taken along line 7—7 in FIG. 6, with FIG. 7A specifically showing the condition when the projection 60 is not inserted into the hole 62 (i.e., when the rear cover 51 is removed), and with FIG. 7B showing the condition when the projection 60 is inserted (i.e., when the rear cover 51 is attached).
Figure 7B:
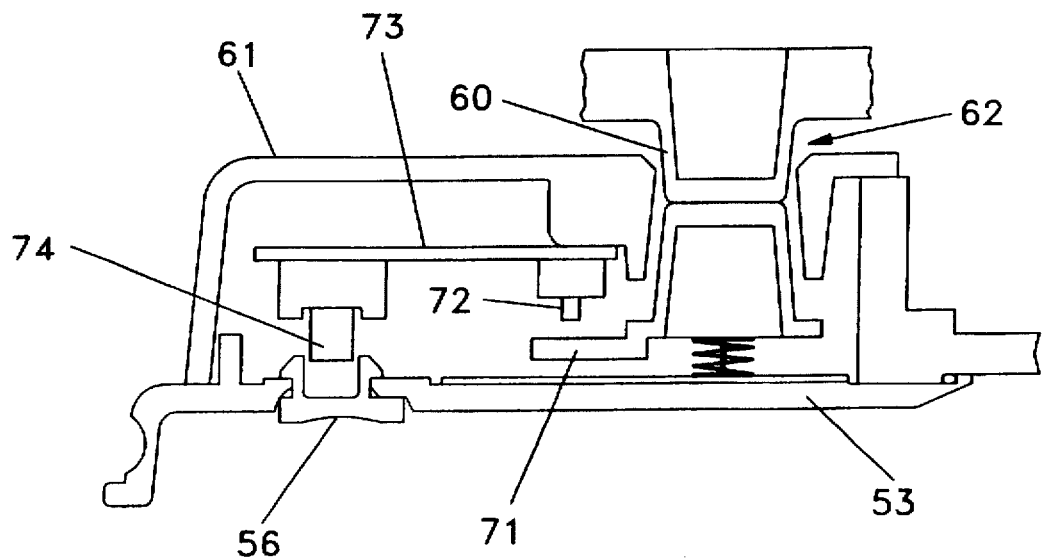

FIGS. 7A and 7B are cross-sectional views taken along line 7—7 of FIG. 6, which bisects the hole 62. More specifically, in FIG. 7A is shown the state where the protrusion 60 is not inserted into the hole 62 (i.e., the rear cover 51 is removed), and in FIG. 7B is shown the state where the protrusion 60 is inserted into the hole 62 (i.e., the rear cover 51 is attached). The attachment detection mechanism 70 can best be understood from the following explanation that is given while referring to FIG. 7.

Referring to this figure, an actuator 71 is mounted in the hole 62. The actuator 71 has an extended convex portion near its center and a flat portion around its circumference. The convex portion is constantly urged forward by a spring 75 in the direction of arrow P. A part of the flat portion of the actuator 71 abuts upon the distal end of a switch 72. An inverter circuit board 73 is included in an internal space that is defined by the front bezel 53 and the back member 61. The inverter circuit board 73 is a printed cirucit board on which is mounted circuits (not shown) that control the luminance/contrast of the liquid crystal display panel 52. In addition, the switch 72 for controlling the power to the backlight 59 and a volume variable control 74 for adjusting a luminance/contrast are also mounted on the inverter circuit board 73. The switch 72 is constantly urged forward by internal spring 76 in the direction of arrow Q. When the switch 72 protrudes in the direction Q, the switch is turned on and power is supplied to the backlight 59. When the switch 72 is forced down in the opposite direction, it is turned off and the power to the backlight 59 is cut off. The variable control 74 interlocks with the slide knob 56 that is provided on the surface of the front bezel 53. The force P of the spring 75 is set so that it is greater than the force Q of the spring 76.

When the rear cover 51 is detached and the protrusion 60 is removed from the hole 62, the area above the convex portion of the actuator 71 is open, as is shown in FIG. 7A. As a result, the actuator 71 is urged forward by the spring 75 in the direction of arrow P, and the flat portion turns the switch 72 off against the force Q of the spring 76. That is, when the rear cover 51 is removed to prepare the notebook computer 1 for use with an OHP device, the backlight 59 is automatically turned off.

When the rear cover 51 is attached, the protrusion 60 is inserted into the hole 62 and pushes the actuator 71 in the direction that is opposite to that of arrow P, as is shown in FIG. 7B. Accordingly, the switch 72 is released by the flat portion of the actuator 71 and is urged forward by the spring 76 in the direction of arrow Q, thereby turning it ON. That is, when the rear cover 51 is attached so that the apparatus can be used as a common notebook computer, the backlight 59 is automatically turned on.

Since the function that automatically turns on and off the backlight 59 eliminates the chance of a user accidentally touching the externally exposed backlight 59 when it is turned on, operational safety is ensured. Further, since a user does not have to make a conscious effort to turn the backlight 59 on and off when detaching and attaching the rear cover 51, ease of use is enhanced. In addition, as the backlight 59 is not unnecessarily turned on, power is conserved.

Figure 8:
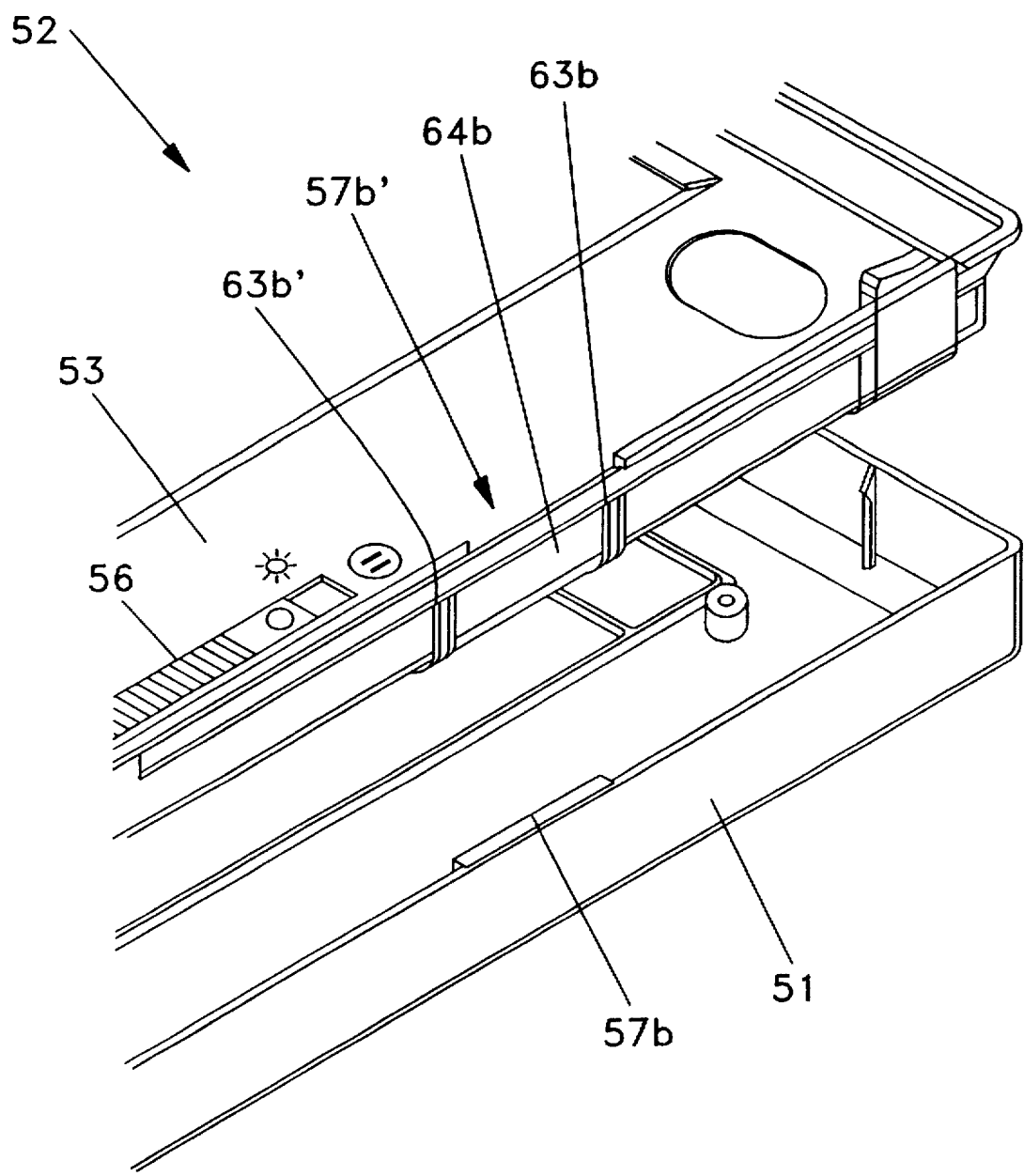
FIG. 8 is a perspective view from the front of the lid 50, showing the latch 57b on the right side of the rear cover 51 released from the notch 57b' of the front bezel 53.
Figure 9:
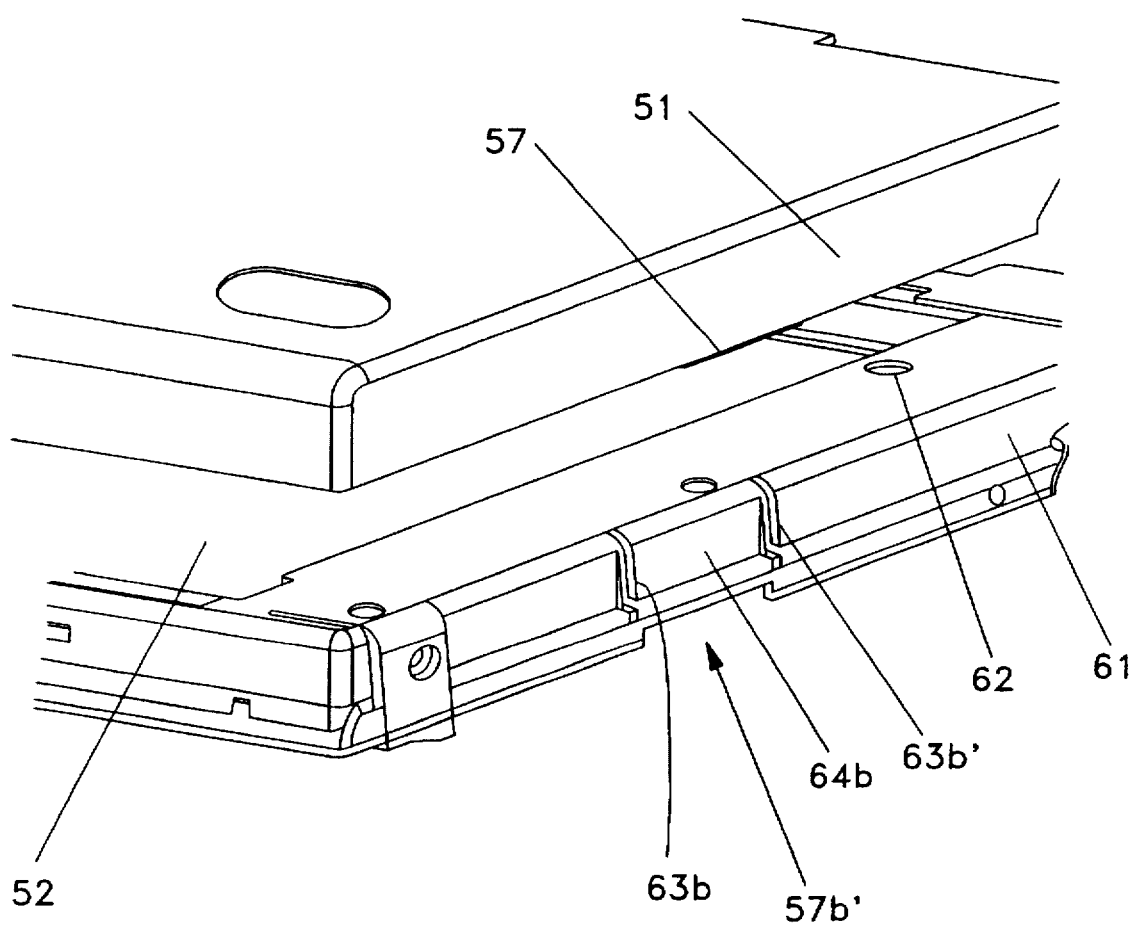
FIG. 9 is a perspective view from the rear of the lid 50, showing the latch 57b on the right side of the rear cover 51 removed from the notch 57b' of the front bezel 53.

FIGS. 8 and 9 are, respectively, front and rear views of the lid 50 and show the state where the latch 57b on the right edge of the rear cover 51 is disengaged from the notch 57b' of the front bezel 53.

As previously described, the paired ribs 63b and 63b' are provided on the left side face of the back member 61. When the rear cover 51 is to be attached to, or removed from, the front bezel 53, the ribs 63b and 63b' restrict the movement of the latch 57b and permit it to be shifted only forward and backward. The guide face 64b, whose end limits are delimited by the ribs 63b and 63b', is tapered slightly so that the latch 57b can be moved smoothly. Further, the notch 57b' that engages the latch 57b is formed on the left end of the front bezel 53, and a plurality of grooves are formed in the surface of the latch 57b so that a user can securely engage it with a finger. It should be understood that the latch 57b, the notch 57b', the ribs 63b and 63b', and the guide face 64b are so formed as to be symmetric with the latch 57a, the notch 57a', the ribs 63a and 63a', and the guide face 64a.

When the rear cover 51 is pushed from the back, with the latch 57b being held in alignment by the ribs 63b and 63b', the latch 57b slides across the guide face 64b while being guided by the rib 63b until it finally engages the notch 57b'. As is shown in FIG. 3A, when the latch 57b is disengaged from the notch 57b' by applying sufficient force to extend the latch 57b outward, the latch 57b is forced inward by the elasticity of the material and slides across the guide face 64b in a direction of the taper (i.e., the removal direction). A user, therefore, can easily remove the rear cover 51, and use of use is ensured. Since the illustrations in FIGS. 8 and 9 of the essential portions, such as the latch 57b and the notch 57b', that are employed for the attachment and the removal of the rear cover 51 are drawn larger than those in FIGS. 4 and 6, the structure and function of the individual components can be more clearly understood.

Figure 10A:
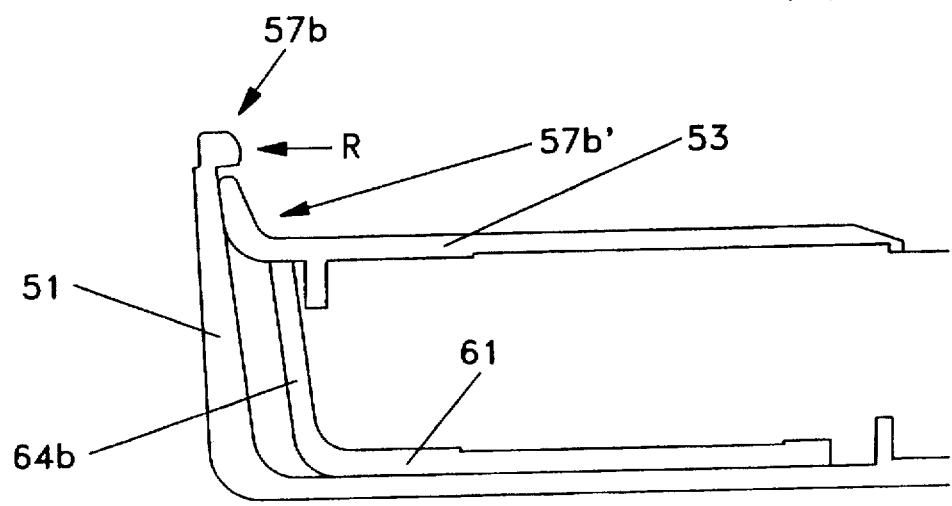
FIGS. 10A and 10B are cross-sectional views of the front bezel 53 taken along line 10—10 in FIG. 6, with FIG. 10A specifically showing the condition when the rear cover 51 is attached, and with FIG. 10B specifically showing the condition when the rear cover 51 is detached.
Figure 10B:
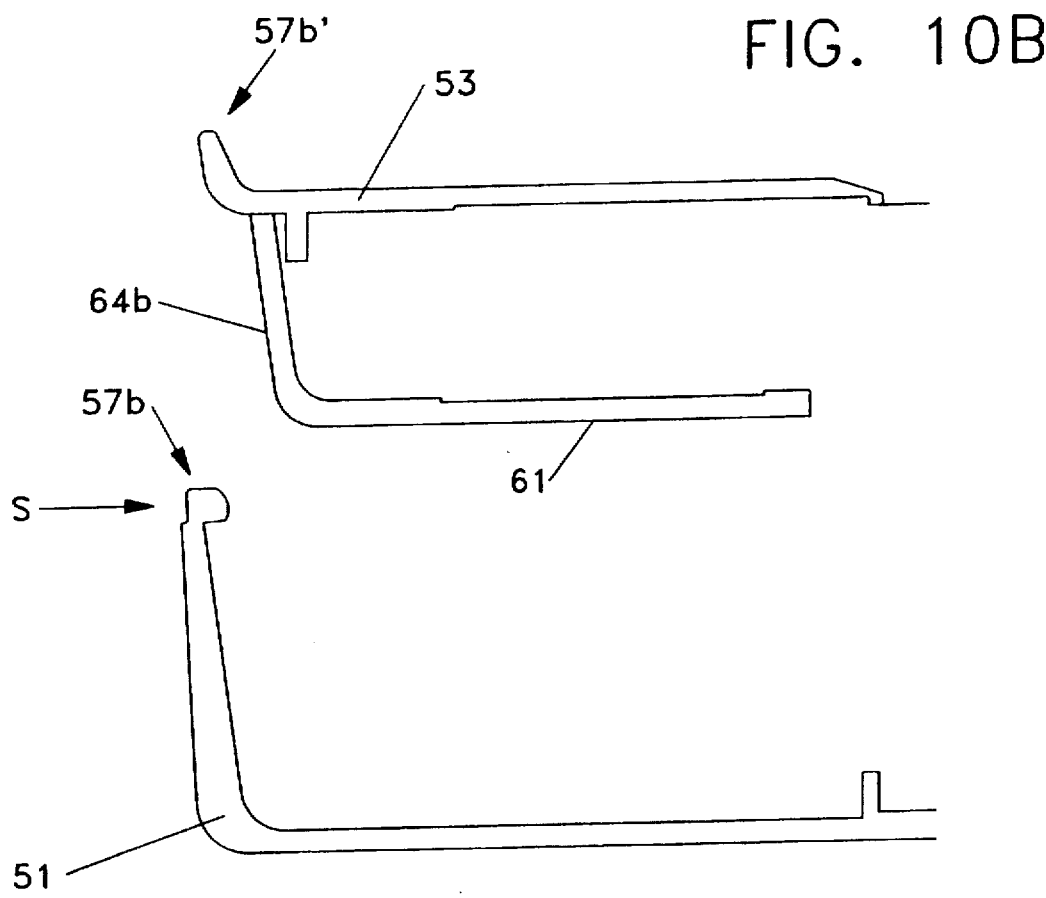

FIGS. 10A and 10B are is a cross-sectional views taken along the line 10—10 of FIG. 6. More specifically, FIG. 10A shows the state where the rear cover 51 is attached, and FIG. 10B shows the state where the rear cover 51 has been removed. Since the line B—B bisects the latch 57b and the notch 57b', it should be clearly understood when referring to these figures whether the latch 57b is engaged with or disengaged from the notch 57b'.

As is shown in FIG. 10A, by engaging the notch 57b' with the latch 57b, the rear cover 51 is held in place at the front bezel 53. When the side wall of the rear cover 51 is pressed outward by force R, the latch 57b is displaced outward and can be disengaged from the notch 57b'. Once the latch 57b is disengaged, recovery force S, which acts in the opposite direction to that of the force R, is applied to the latch 57b, as is shown in FIG. 10B. As a consequence, the distal end of the latch 57b is pressed against the tapered guide face 64b, and slides down in the direction of the taper. On the other hand, when the rear cover 51 is being attached, the latch 57b is slid along the guide face 64b against the resistance of the recovery force S. Then, when a comparatively large resistance force R is acting on the latch 57b just before it reaches the notch 57b', the latch 57b engages the notch 57b'. Thus, the attachment and the removal of the rear cover 51 can be performed by a simple procedure.

In FIG. 10A, the latches 57a and 57b are positioned inside the lid 50 (i.e., on the face that includes the liquid crystal display panel 52). It would be understood that, when the lid 50 is closed against the main body 10, the latches 57a and 57b are hidden inside and the force R that is required to disengage them cannot be applied since the removal of the rear cover 51 is inhibited when the lid 50 is closed, there is no possibility of the person's fingers pressing and accidentally disengaging the latches 57a and 57b and causing the lid 50 to fall off.

C. Installation to an OHP device

Some one examples of mechanisms for attaching the notebook computer 1 to an OHP will now be described.

Attachment Example 1

Figure 11A:
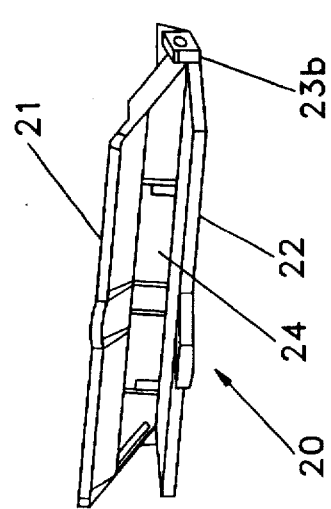
FIGS. 11A through 11D are perspective views of the stand 20, with FIG. 11A being a front view, FIG. 11B a rear, FIG. 11C a view of the back side of the stand, and FIG. 11D a top view of the stand in the closed position.
Figure 11B:
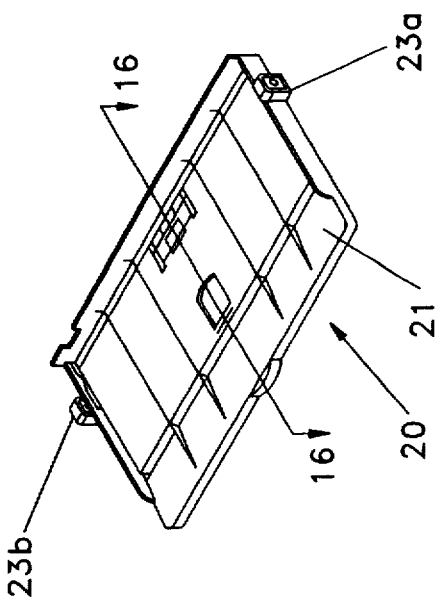
Figure 11C:
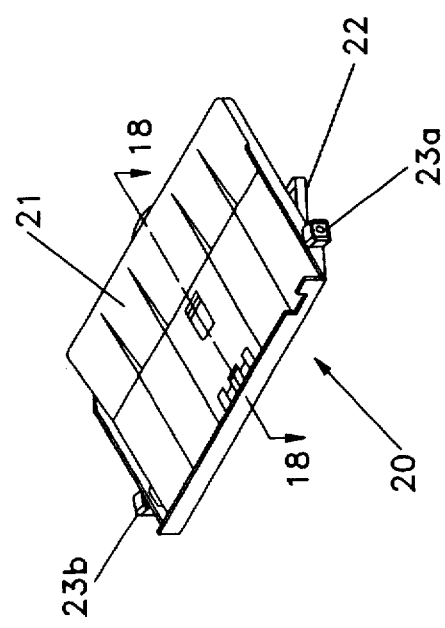

The first attachment example is a stand 20 which can be attached to an OHP and on which the notebook computer 1 is mounted. FIGS. 11A through 11D illustrate the detached stand 20, while FIGS. 12A and 12B depict the notebook computer 1 and stand 20 attached to the OHP.

Referring to FIG. 11, the table 21 and a base 22 are rotatably supported. More specifically, when the stand 20 is in use, the table 21 is opened relative to the base 22 and an arm 24 on the base 22 is positioned upright so that it supports the table 21 at an angle of inclination of about 20°, as is shown in FIGS. 11A and 11B. As illustrated in FIG. 12, a user merely installs the stand 20, which is opened in the described manner, over the light source of an OHP (more specifically, a user secures it with the strap 40, as will be described in detail later), and mounts the main body (keyboard) 10 of the notebook computer 1 on the stand. When the stand 20 is not in use, as is shown in FIG. 11D, the arm 24 is folded down and the table 21 and the base 22 are closed to make the stand 20 compact, so that it can be easily stored or carried. The detailed structure and the function of the stand 20 will now be described with reference to FIGS. 13 through 15.

Figure 13:
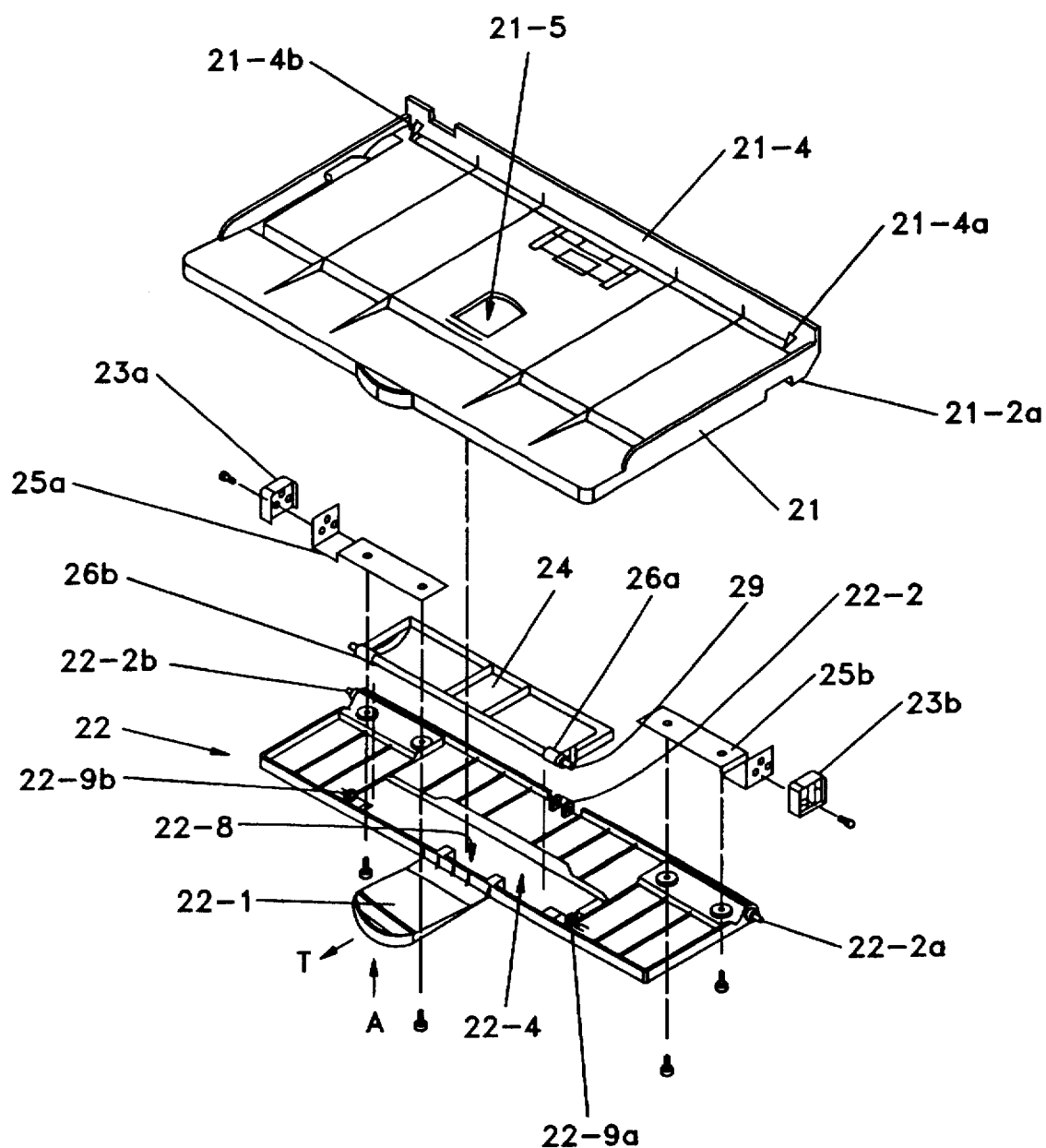
FIG. 13 is an exploded perspective view of the stand 20.

Referring to FIG. 13, which is an exploded perspective review of the stand 20, the base 22 is a nearly flat plate with an integrally formed handle 22-1 and an opening 22-4 that are positioned hear at its front center. The handle 22-1 is held by a user when disengaging the base 22 from the table 21. A latch 22-8 is provided at the proximal end of the handle 22-1 to engage a latch 21-8, which is formed on the table 21 (the latch 22-8 is not shown in FIG. 13 because it is hidden by a rib; it will be described later while referring to FIGS. 16 and 18). The opening 22-4 is formed so that the tensile strength of the base 22 is reduced in order for the handle 22-1 to be easily bent in the direction indicated by arrow T, and so that the opening 22-4 can serve as the storage place for the arm 24 when the stand 20 is closed (FIG. 11D) (which will be described later). Protruding shafts or rods 22-2a and 22-2b, are fromed at the rear ends of the base 22 and attach the base 22 to the table 21. A ribbed protrusion 22-2 (which will be described later) is formed at the rear and near the center of the base 22. Further, shaped brackets 25-a and 25-b are fixed by screws at the upper right and left rear portions of the base 22. Caps 23-a and 23-b are fixed by screws to the side edges of the brackets 25-a and 25-b and are used for the attachment of the strap 40 (the structures of the strap 40 and the caps 23-a and 23-b, and the attachment of the strap 40 will be described later).

A single shaft 29 is attached to the front edge of the arm 24. Both ends of the shaft 29 project out from the arm 24, and the projected portions are rotatably supported at the base 22 by bearings 22-9a and 22-9b. A pair of torsion springs 26-a and 26-b are fitted around the shaft 29. The ends of both the springs 26-a and 26-b extend from the coil in a direction perpendicular to each other. Therefore, when the arm 24 and the base 22 are assembled, the springs 26-a and 26-b provide rotational force for the arm 24 in the direction in which the arm 24 rises from the base 22.

The table 21 is approximatley a flat plate that includes a rear wall 21-4 and an opening 21-5 near its center. The rear wall 21-4, which is formed almost at a right angle relative to the table 21, contacts and holds the back portion of the notebook computer 1 and prevents the computer from sliding across the inclined face of the table. Small protrusions 21-4a and 21-4b are formed on the lower right and left surfaces of the rear wall 21-4. The small protrusions 21-4a and 21-4b engage recess portions (which will be described later) that are formed on the right and left sides of the rear surface of the notebook computer 1. The opening 21-5 is formed so that a user can observe the condition of the arm 24 and can fold the stand 20 by pushing down on the arm 24 with a finger through the opening 21-5. Bearings 21-2a and 21-2b are formed in the lower rear sides of the table 21. The protruding rods 22-2a and 22-2b are inserted into the bearings 21-2a and 21-2b to rotatably support the base 22.

Figure 14:
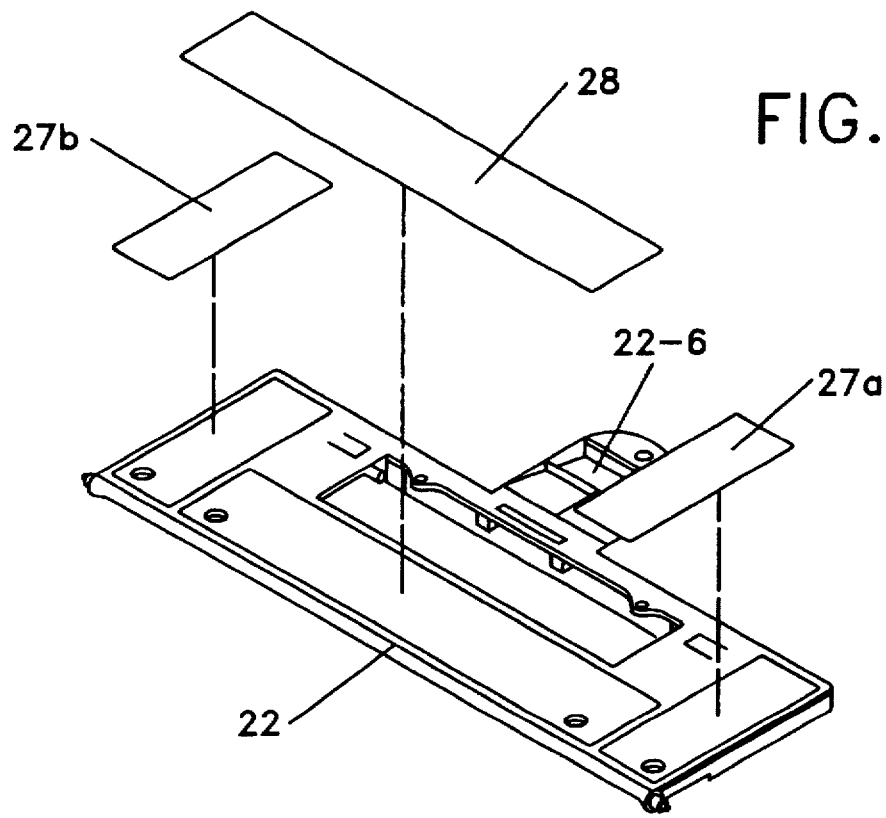
FIG. 14 is a perspective view of the base 22 as viewed from the direction indicated by arrow A in FIG. 13.

FIG. 14 is a perspective view of the reverse side of the base 22 when viewed from the direction of arrow A in FIG. 13. As is apparent from FIG. 12, the reverse side of the base 22 contacts the OHP light source. Referring to FIG. 14, a pair of rubber sheets 27a and 27b and a shield member 28 are adhered to the reverse side of the base 22. The rubber sheets 27a and 27b serve as cushioning pads on the glass of the OHP light source and also prevent sliding. The shield member 28 is made of aluminum foil, for example, and reflects heat that is irradiated by the OHP light source. Further, a recessed portion 22-6 is formed in the reverse side of the handle 22-1, so that a user can easily grasp the handle 22-1 with his or her fingers.

Figure 15:
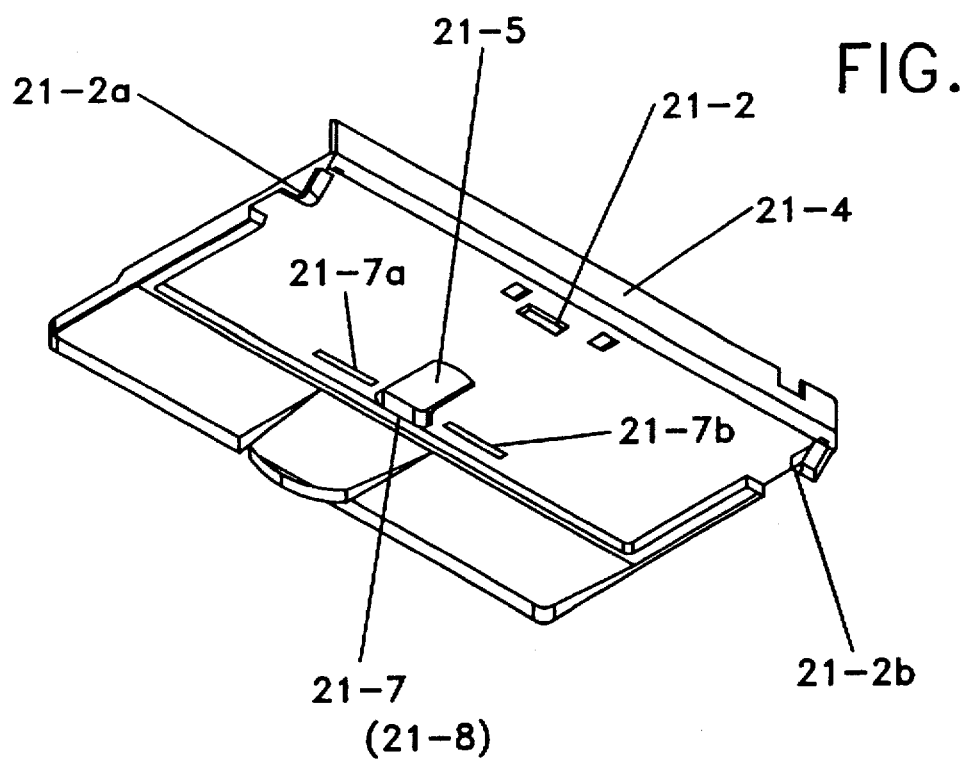
FIG. 15 is a perspective view of the table 21 as viewed from the direction indicated by arrow A in FIG. 13.

FIG. 15 is a perspective view showing the reverse side of the table 21, as viewed from the direction of arrow A in FIG. 13. As is shown in FIG. 15, a stopper 21-7 that projects outward almost perpendicularly is formed adjacent to the opening 21-5. Tabs 21-7a and 21-7b are formed to either side of 21-7. When stand 20 is opened, the rear edge of the arm 24 abuts upon stopper 21-7 and tabs 21-7a and 21-7b to hold table 20 open at a predetermined angle (about 20° in this embodiment). A latch 21-8 is formed on the reverse side of stopper 21-7. When the stand 20 is closed, the latch 21-8 engages latch 22-8 on the base 22 and together they maintain the stand 20 in the closed state (which will be described later). A small shank 21-2, which in cross section has an almost recessed shape, is formed to the rear of the opening 21-5. The small shank 21-2 pivots on the ribbed protrusion 22-2 that is provided on the base 22. At the front and almost in the center of the table 21, space is defined by ribs to accommodate the handle 22-1 of the base 22.

Figure 11D:
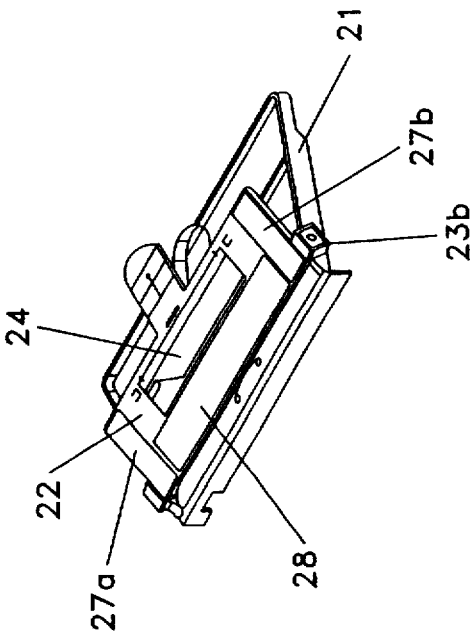
Figure 12B:
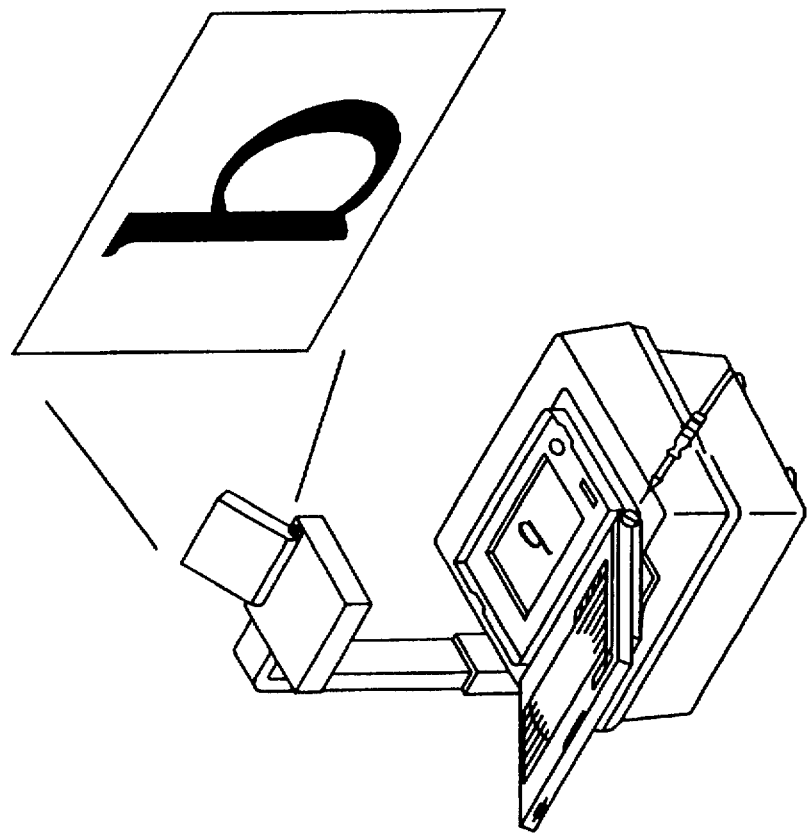
FIGS. 12A and 12B are perspective views of the notebook computer 1 installed on an OHP by using the stand 20, with FIG. 12A showing the keyboard 12 positioned on the projection screen side, and with FIG. 12B specifically showing the keyboard 12 positioned opposite the projection screen (i.e., the audience side).
Figure 12A:
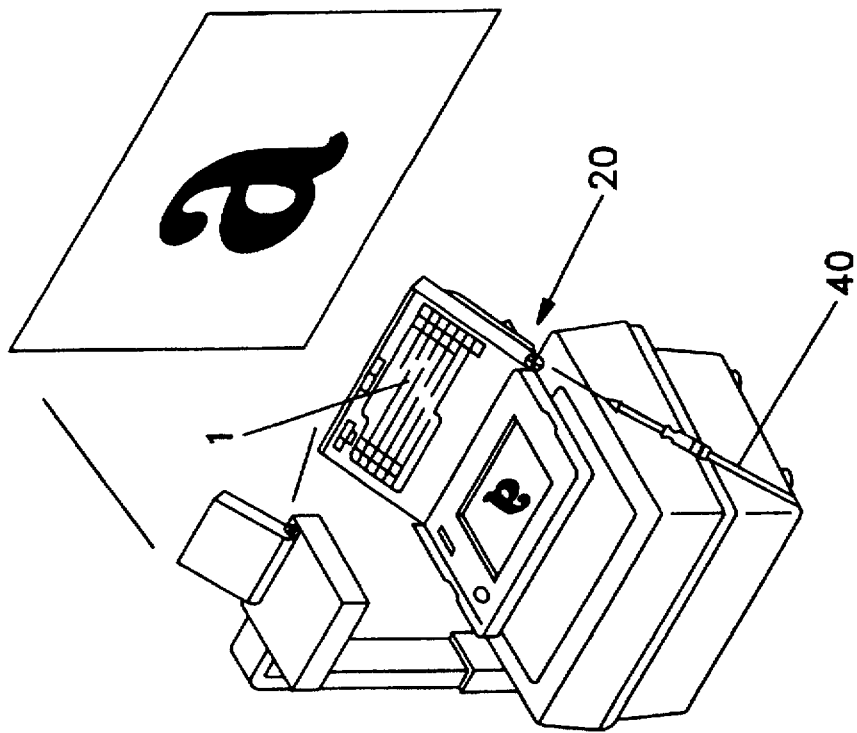
Figure 16:
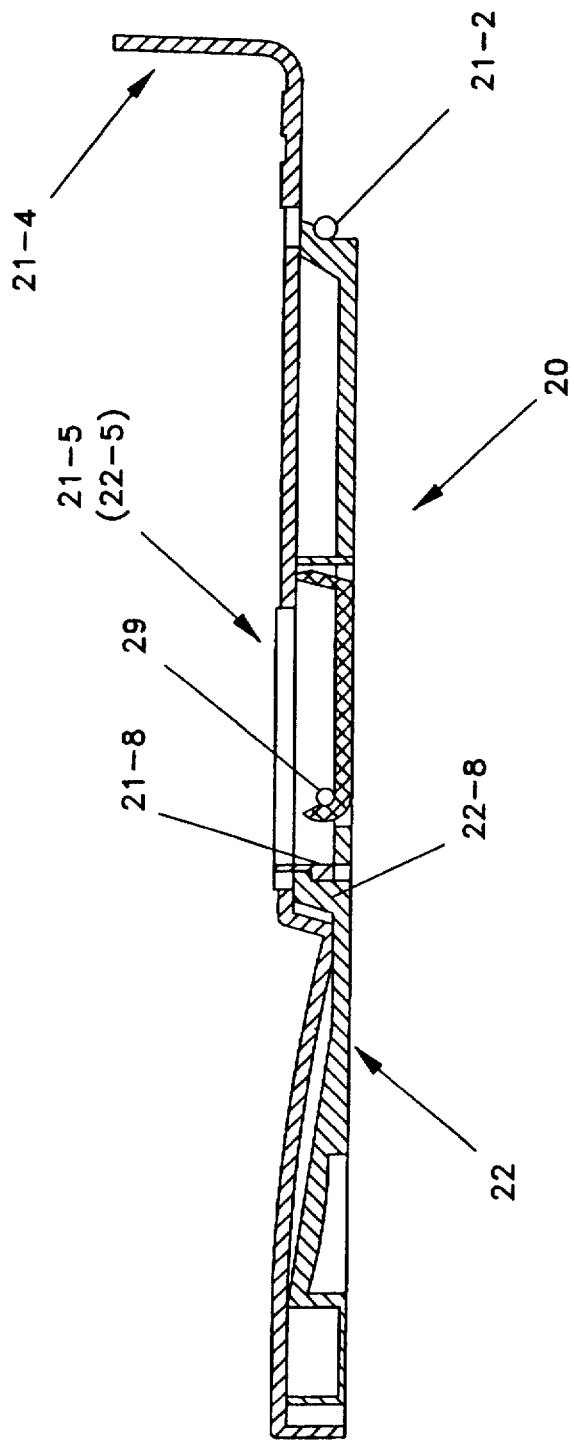
FIG. 16 is a cross-sectional view of the stand 20, taken along line 16—16 in FIG. 11D (i.e., in the closed state).

FIG. 16 is a cross-sectional view of stand 20, taken along the line 16—16 of FIG. 11D, and depicts the stand in the closed position. Rotational force in the direction in which the arm 24 rises from the base 22 (counterclockwise around the shaft 29 in FIG. 16) is given to the arm 24 by the springs 26-a and 26-b. An opening force therefore acts on the base 22 and table 21 (clockwise at the small shank 21-2 in FIG. 16). In FIG. 16, the latch 21-8 of the table 21 engages the latch 22-8 of the base 22, thereby holding the stand 20 closed against the opening force exerted by the springs 26-a and 26-b. Since, at this time, the arm 24 is stored in the opening 22-5 of the base 22, the table 21 and the base 22 are almost completely closed. Therefore, the closed stand 20 is thin, except for the bent rear edge 21-4, and can be conveniently stored and carried.

Figure 17:
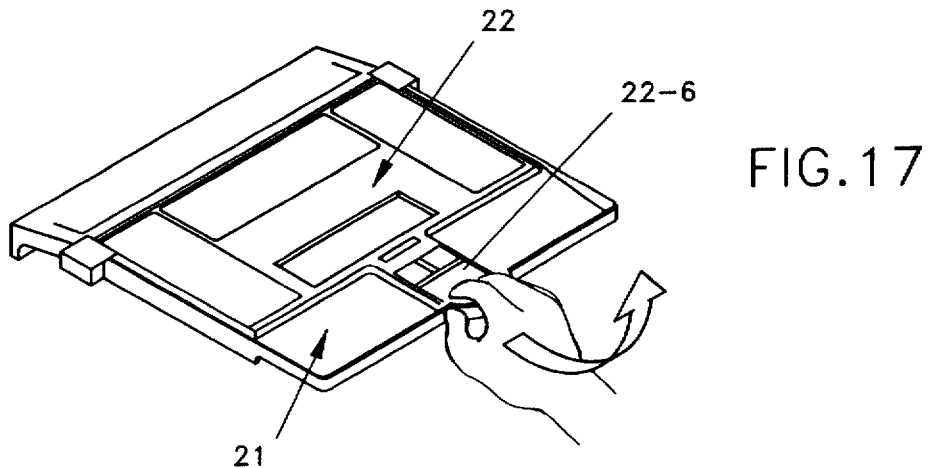
FIG. 17 is a diagram depicting a user opening the stand 20.

Refer to FIG. 17 for an illustration of how stand 20 is opened. A user inverts the stand 20 and pulls the handle 22-1 to the front relative to the table 21 by grasping the recessed portion 22-6 in the surface of the handle 22-1. Since, as is previously described, the opening 22-5 is near the center of the base 22, the handle 22-1 is bent by the stress and is shifted to the front together with the latch 22-8, which is positioned at the proximal end of the handle 22-1, and the latch 22-8 is disengaged from the latch 21-7. As a result, the arm 24 is raised from the base 22 by the opening force of the springs 26-a and 26-b, and the table 21 pivots away from the base 22.

FIG. 18 is a cross-sectional view of stand 20, taken along the line 18—18 of FIG. 11A, and depicts the stand in the open position. Since the arm 24 is forced up by the springs 26-a and 26-b, it pivots upward relative to the base 22 in the direction indicated by the arrow U (counterclockwise around the shaft 29 in FIG. 18). Table 21 is hinged at the ribbed protrusion 22-2 and protrusions 22-2a and 22-2b of the base 22 by the small shank 21-2 and by the bearings 21-2a and 21-2b. When the table 21 is pushed up by the arm 24, it is separated from the base 22 at the rear edge. As the table 21 is opened, the rear edge of the arm 24 slides across the reverse side of the table 21 until it is finally stopped when it abuts upon the stopper 21-7 and the tabs 21-7a and 21-7b. In this condition, since the table 21 is supported from the reverse side by the arm 24, it will not close even when a heavy object, such as a notebook computer, is mounted on it. Approximately a 20° angle is formed by the base 22 and the table 21 when the stand 20 is open. To close the stand 20, the arm 24 is folded in the direction that is opposite to that which is indicated by the arrow U by slipping a finger through the opening 21-5 while holding the table 21, and then the table 21 is closed and the latch 21-8 engages the latch 22-8 of the base 22.

Figure 19:
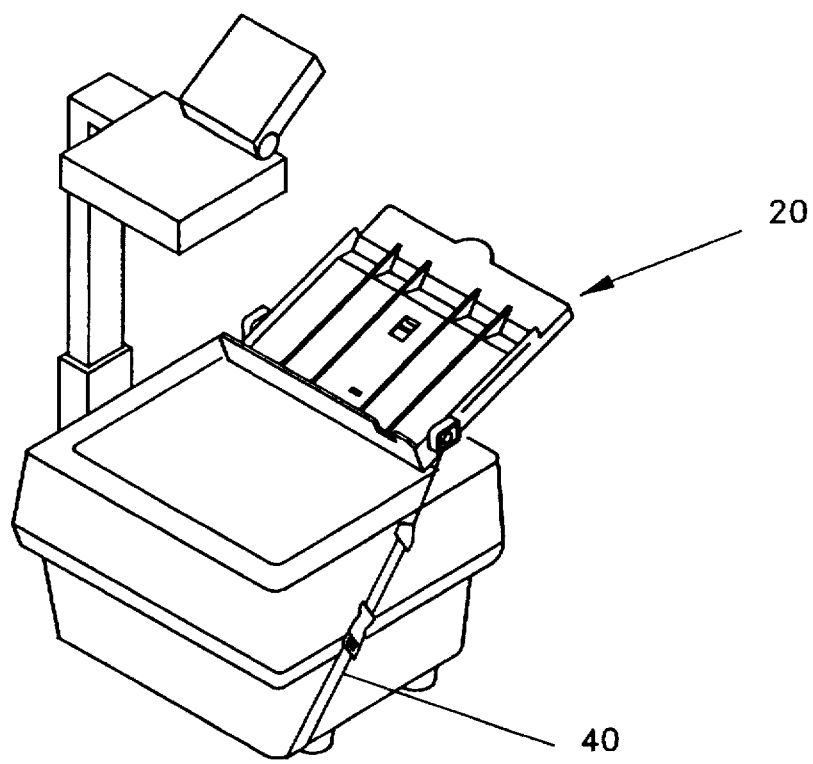
FIG. 19 is a perspective view of the stand 20 fixed to an OHP.

The strap 40, which is one option, is employed to fasten the stand 20 to the OHP light source, as is shown in FIG. 19, for example. As is previously described, caps 23a and 23b are provided on both sides of the rear of the stand 20, to which the ends of the strap 40 are connected. The structure that is fitted into the caps 23a and 23b to secure the ends of the strap 40 will be described in detail later.

Figure 20:
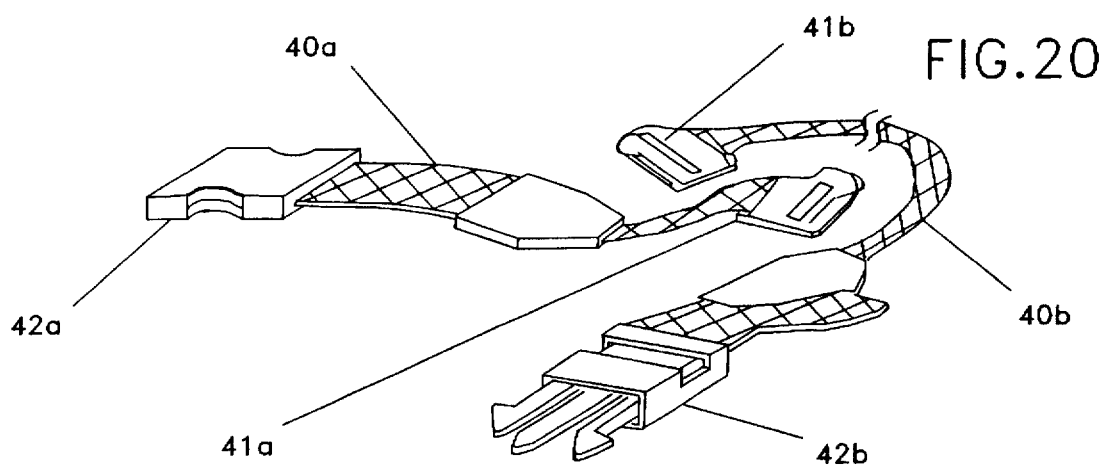
FIG. 20 illustrates the strap 40 that is used to secure the stand 20 to an OHP.

FIG. 20 is a diagram showing the outline of the strap 40 that is employed to fasten the stand 20. In this embodiment, the strap 40 is separated into right and left portions 40a and 40b. The portions 40a and 40b respectively include locking mechanisms 41a and 41b that can be fitted in the respective caps 23a and 23b, and connectors 42a and 42b that are linked together. The connector 42b includes a mechanism by which the length of the strap 40 can be adjusted.

Figure 21A:
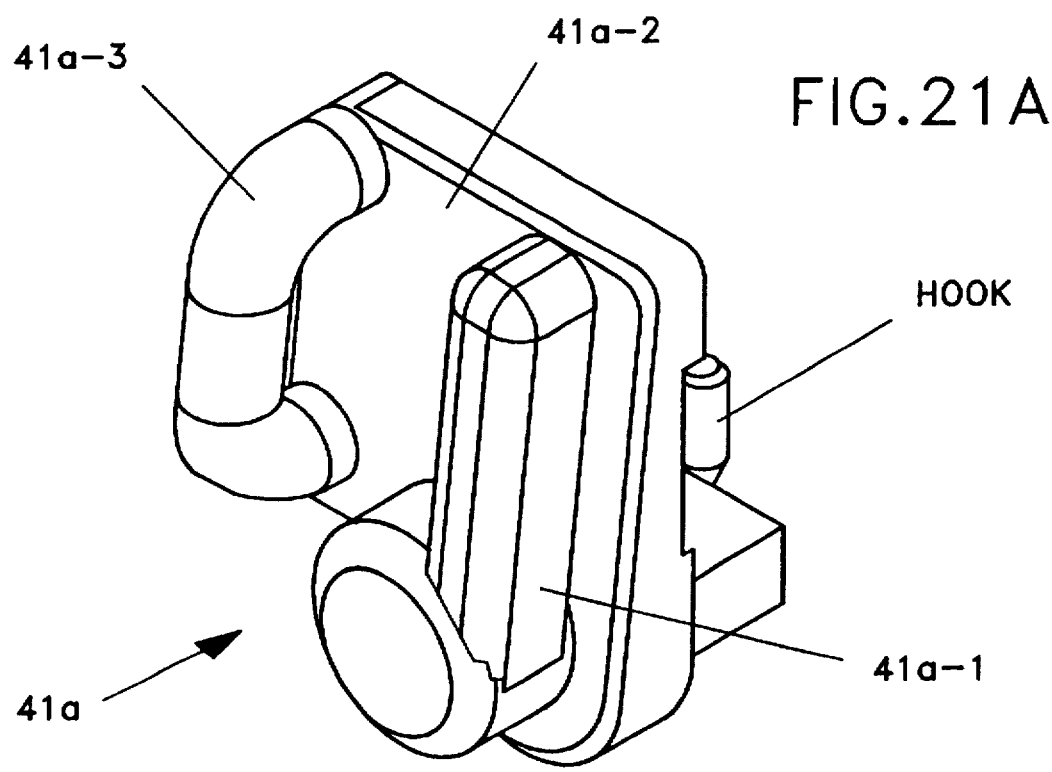
FIGS. 21A and 21B illustrate, respectively, the obverse and reverse sides of the locking mechanism 41a when a knob 41a-1 is located at an locked, with FIG. 21A being a perspective view of its obverse side and with FIG. 21B being a perspective diagram of its reverse side.
Figure 21B:
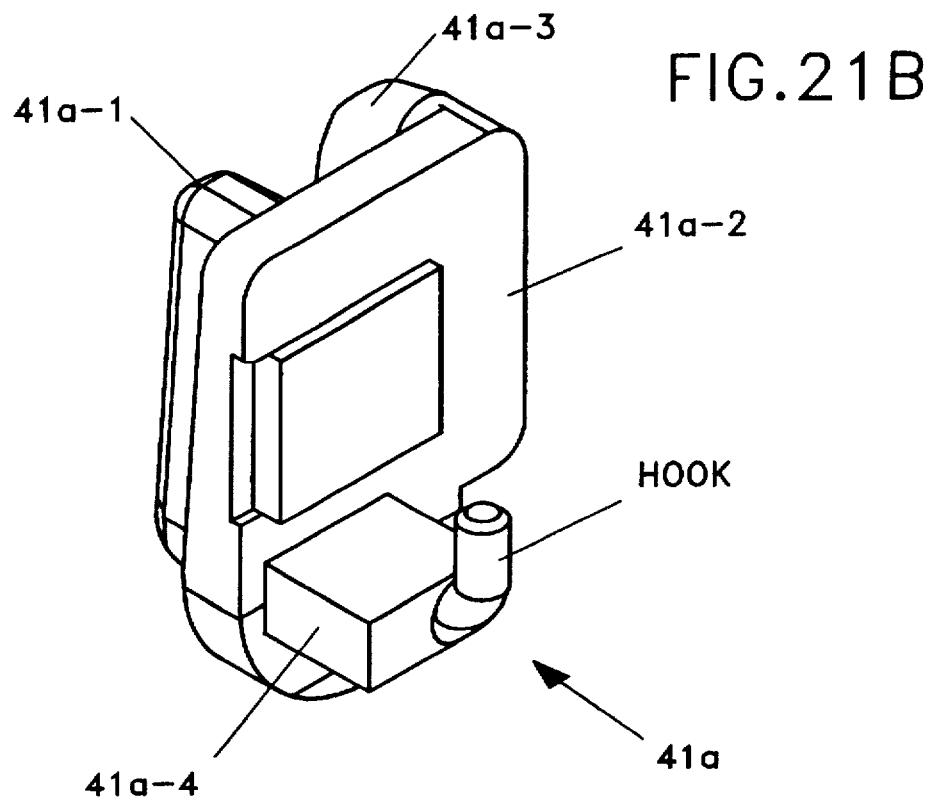

FIGS. 21A and 21B are perspective views of the locking mechanism 41a, as viewed from the front and back sides, respectively. The locking mechanism 41a includes a knob 41a-1 and a base 41a-2. The knob 41a-1 is coupled to an L-shaped hook that penetrates the base 41a-2 from the rear. The base 41a-2 has a bracket 41a-3 on the front face for fastening the strap 40, and a protrusion 41a-4 that is formed on its reverse face and into which the insertion hole for the hook is formed.

Figure 24:
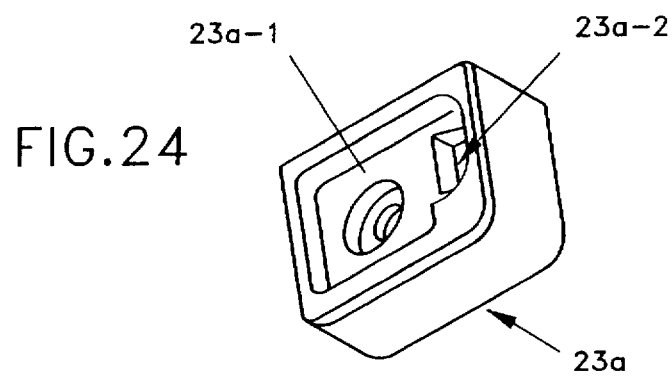

The cap 23a into which the locking mechanism 41a can be fitted is shown in FIG. 24. An opening 23a-1, which has a shape that is almost the same as the base 41a-2, is formed in the surface of the cap 23a, and a through hole 23a-2 through which the protrusion 41a-4 can be passed is formed in the bottom in the opening 23a-1.

Figure 22A:
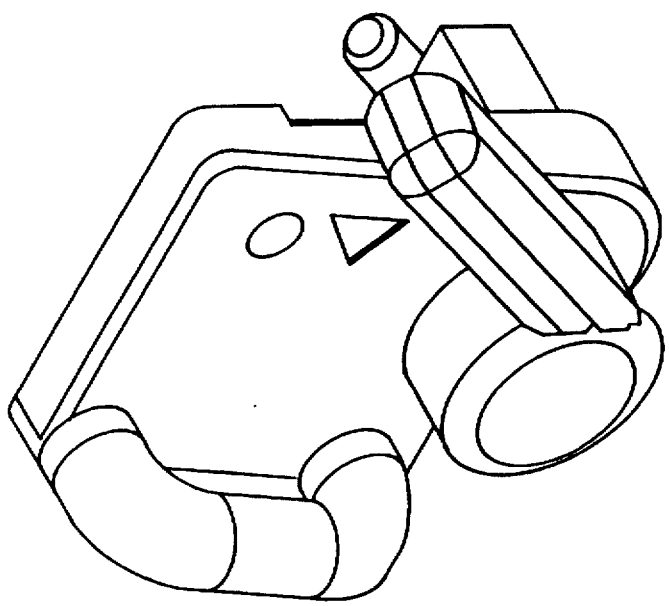
FIGS. 22A and 22B illustrate, respectively, the obverse and reverse sides of the locking mechanism 41a when the knob 41a-1 is located between the locked and insertion positions.
Figure 22B:
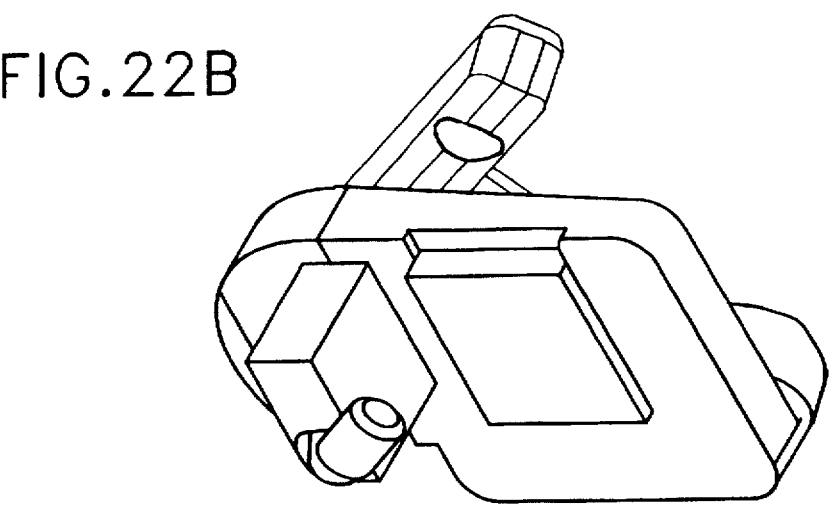
Figure 23A:
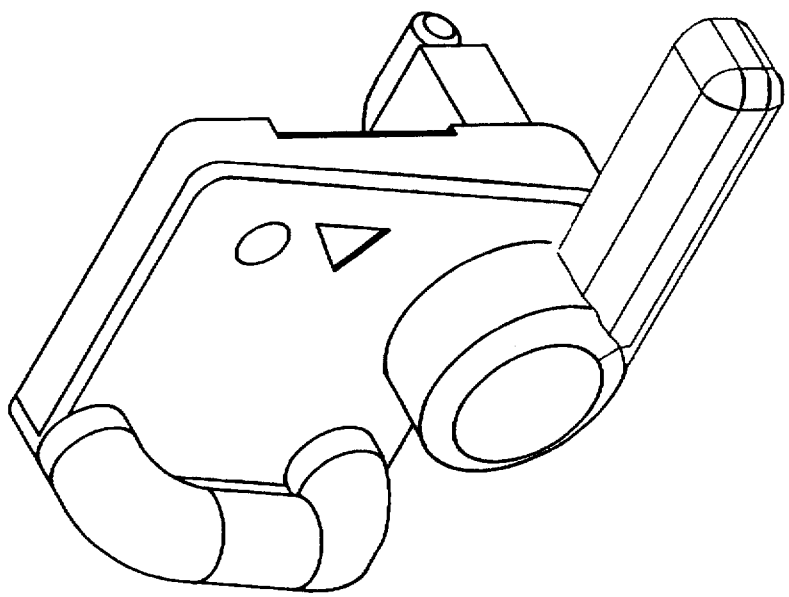
FIGS. 23A and 23B illustrate, respectively, the obverse and reverse sides of the locking mechanism 41a when the knob 41a-1 is in the insertion position.
Figure 23B:
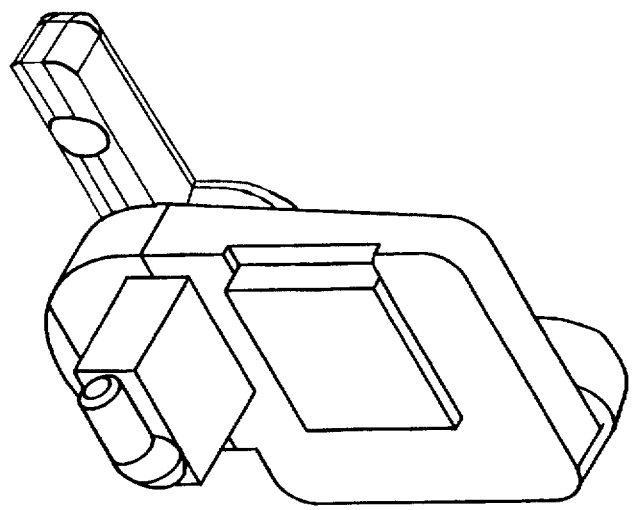

The knob 41a-1 is inserted through the base 41a-2 and rotates with the hook. The locking mechanism 41a can be inserted into and engage the cap 23a (in response to the rotation angle of the knob 41a-1). FIGS. 21 through 23 show the knob 41a-1 and positioned at various angles. In FIG. 23, the knob 41a-1 is positioned for insertion into the cap 23a (insertion position). As is shown in FIG. 23B, the hook in the insertion position lies within the boundaries of the protrusion 41a-4 of the base 41a-2. When the base 41a-2 is inserted into the opening 23a-1, the protrusion 41a-4 engages the through hole 23a-2 and the hook extends to the reverse of the cap 23a. Since a comparatively large cavity (not shown) exists at the reverse side of the through hole 23a-2, the hook can be rotated after it is engaged. When the knob 41a-1 is rotated counterclockwise, as is shown in FIG. 22A, the hook extends out over the boundaries of the protrusion 41a-4. As is shown in FIG. 21(b), at the position (engagement position) at which the knob 41a-1 is rotated 90° from the insertion position, the hook is extended to its furthest point outside the boundaries of the protrusion 41a-4, and the force with which the hook engages the reverse side of the cap 23a is at its the maximum. It should be noted that, although not illustrated, the locking mechanism 41b and the cap 23b are formed symmetrically with the locking mechanism 41a and cap 23a and have the same functions.

Figure 25:
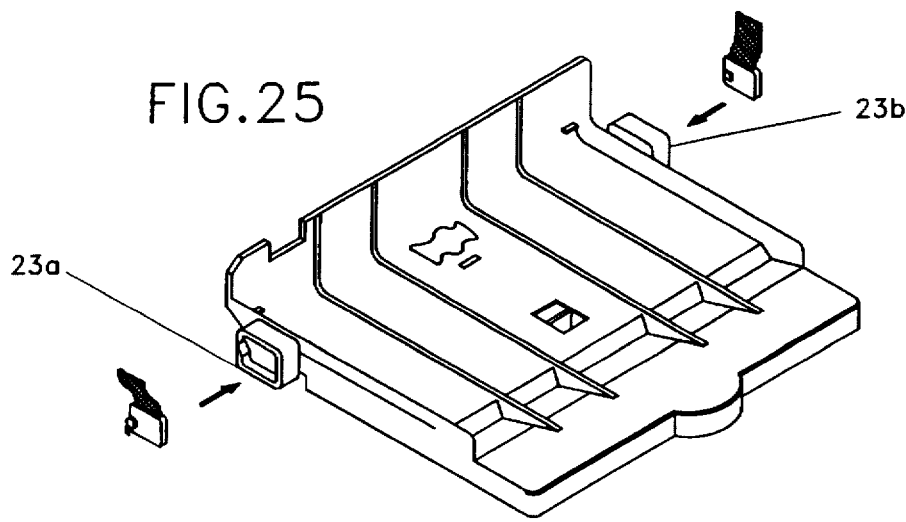
FIGS. 25 and 25A illustrates how the strap 40 is attached to the stand 20 and, in particular, how the locking mechanisms 41a and 41b engage the individual caps 23a and 23b.
Figure 26:
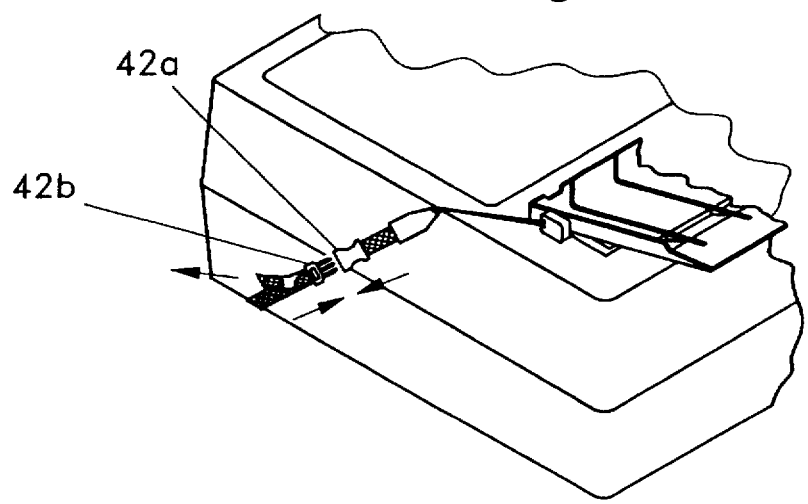
FIG. 26 shows the attachment of the strap 40 to the stand 20 and, more specifically, the coupling of the connectors 42a and 42b and the adjustment of their length.
Figure 25A:
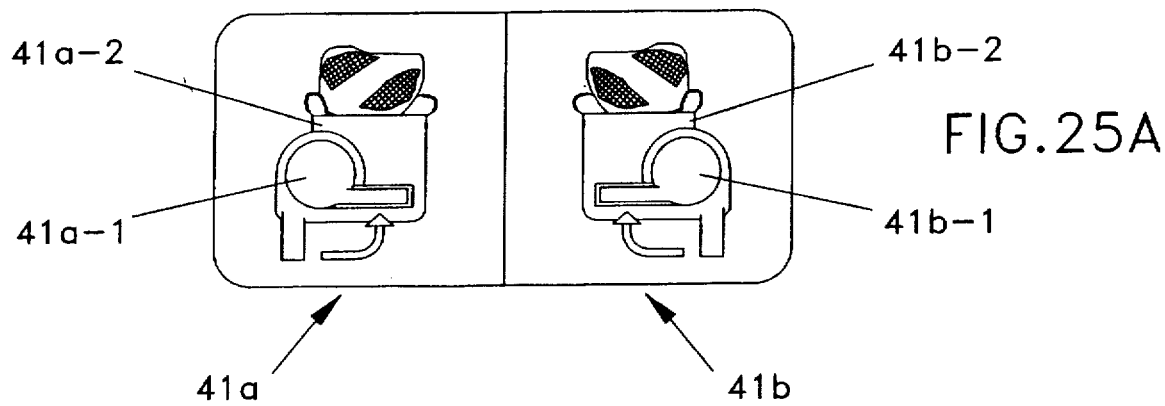

FIGS. 25, 25A, and 26 are diagrams of the strap 40 that is being attached to the stand 20. As is previously described, the caps 23a and 23b are secured by screws at the rear end on either side of the base 22 of the stand 20. A user first sets the knobs 41a-1 and 41b-1 of the locking mechanisms, at the two ends of the strap 40, to with the insertion positions. Then, the user inserts the base 41a-2 and 41b-2 into the openings 23a-1 and 23b-1 of the caps 23a and 23b, respectively, and turns the knobs 41a-1 and 41b-1 to the engagement position (FIG. 25). Finally, the user couples the connectors 42a and 42b together, adjusts the length of the strap 40, and securely fastens the strap 40 to the OHP (FIG. 26).

Figure 27A:
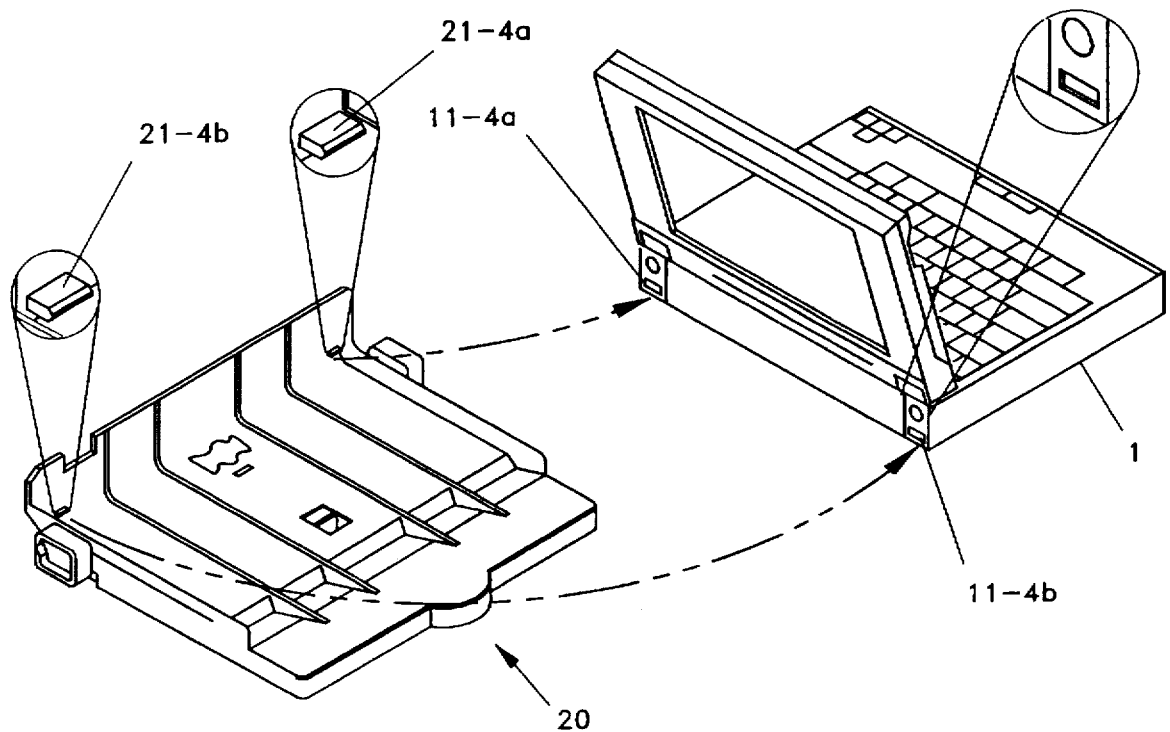
FIGS. 27A and 27B show how to mount the notebook computer 1 on the stand 20, with FIG. 27A illustrating the notebook computer 1 mounted on the table 21, and with FIG. 27B illustrating the adjustment of the degree of opening of the lid 50.
Figure 27B:
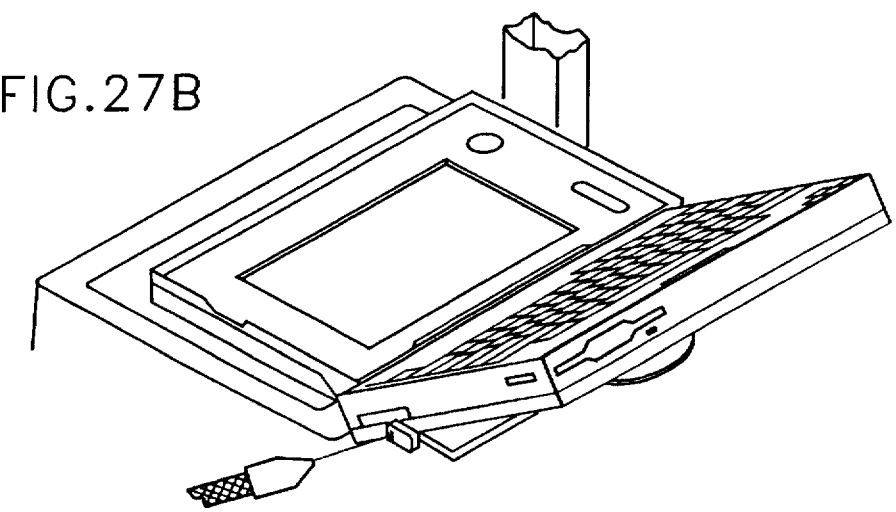

FIG. 27 shows the notebook computer 1 in the process of being mounted on the stand 20. As previously described, small protrusions 21-4a and 21-4b are formed on the right and left ends of the rear wall 21-4 of the table 21. Corresponding small holes 11-4a and 11-4b are formed in the both ends of the back face of the notebook computer 1 so that they can engage the small protrusions 21-4a and 21-4b when the notebook computer 1 is mounted on the table 1. The weight of the notebook computer 1 presses it against the rear wall 21-4 and the small protrusions 21-4a and 21-4b prevent it from shifting. When the notebook computer 1 has been placed on the table 21, the user may adjust the opening of the lid 50 so that the liquid crystal display panel 52 is parallel to the glass of the OHP light source.

The main advantages of this method of attachment, are as follows:

First, when the notebook computer 1 is mounted on the OHP, the main body of the computer can be kept away from the OHP light source, thereby protecting the electronic circuits in the main body from heat that is radiated by the light source. Further, since the main body 10 is inclined at an angle of only about 20° there is little interference with the field of vision of the audience. In addition, since the front edge of the keyboard 12 is positioned only slightly higher than the rear edge, a presenter can use the keyboard to input data.

Second, since the installation of the notebook computer 1 on the OHP basically relies on the stand 20, the design of the components of the notebook computer 1 do not have to be substantially altered. When a presenter leaves the stand 20 fastened to the OHP device and removes only his notebook computers 1, the next presenter can smoothly begin his or her presentation.

Third, in this embodiment, the height of the liquid crystal display panel 52 from the OHP light source section is h__sin 20° (wherein h denotes the thickness of the main body 10). Therefore, compared with the prior art where a liquid crystal display panel is directly placed on an OHP light source (e.g., Japanese Unexamined Utility Model Publication No. Sho 64-121, or Japanese Unexamined Patent Publication No. Hei 04-16824 this example allows the display to be positioned at a height of h__sin 20°. The liquid crystal display panel 52 can be installed lower than when the main body and lid are opened almost horizontally and placed on an OHP light source (e.g., German Unexamined Patent Publication No. 4019755) by a distance that is the equivalent to the amount of inclination of the main body 10 when the table 21 is used, i.e., $\Delta h = h (1-\sin 20°)$. As a result, the liquid crystal display panel can be positioned within the focusing range of the OHP device. Fourth, The stand 20 is fastened to the OHP by the strap 40. Since the strap 40 is made of soft material and its length can be adjusted, differences in shapes and sizes of OHP can be accomodated. In other words, this embodiment can be employed with almost any OHP currently available on the market.

Attachment Example 2

Figure 28:
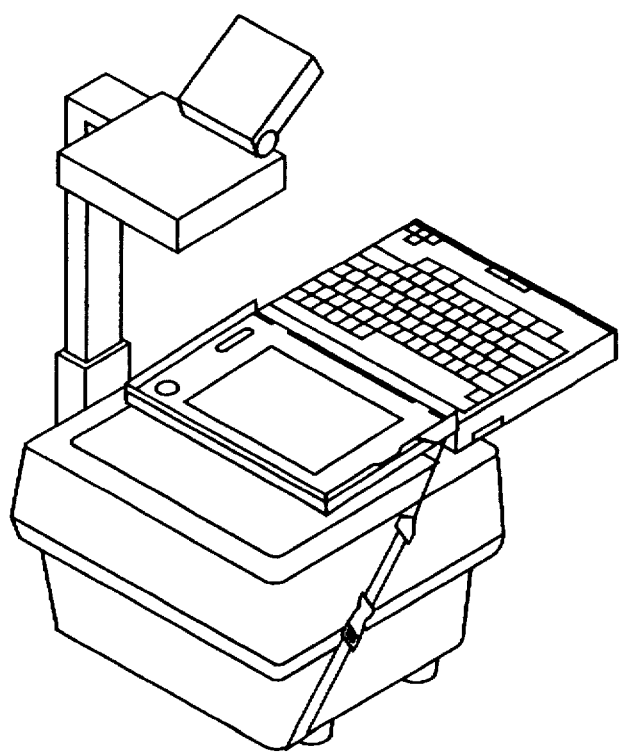
FIG. 28 illustrates the notebook computer 1 mounted on an OHP with the lid 50 opened until it is almost horizontal to the main body 10 of the computer.

As is shown in FIG. 28, the main body 10 and the lid 50 are opened almost horizontally, and the notebook computer is placed directly on the OHP. In this case, as well as in the previous example, the strap 40 is employed to fasten the notebook computer 1 to the OHP for safety reasons.

Figure 29:
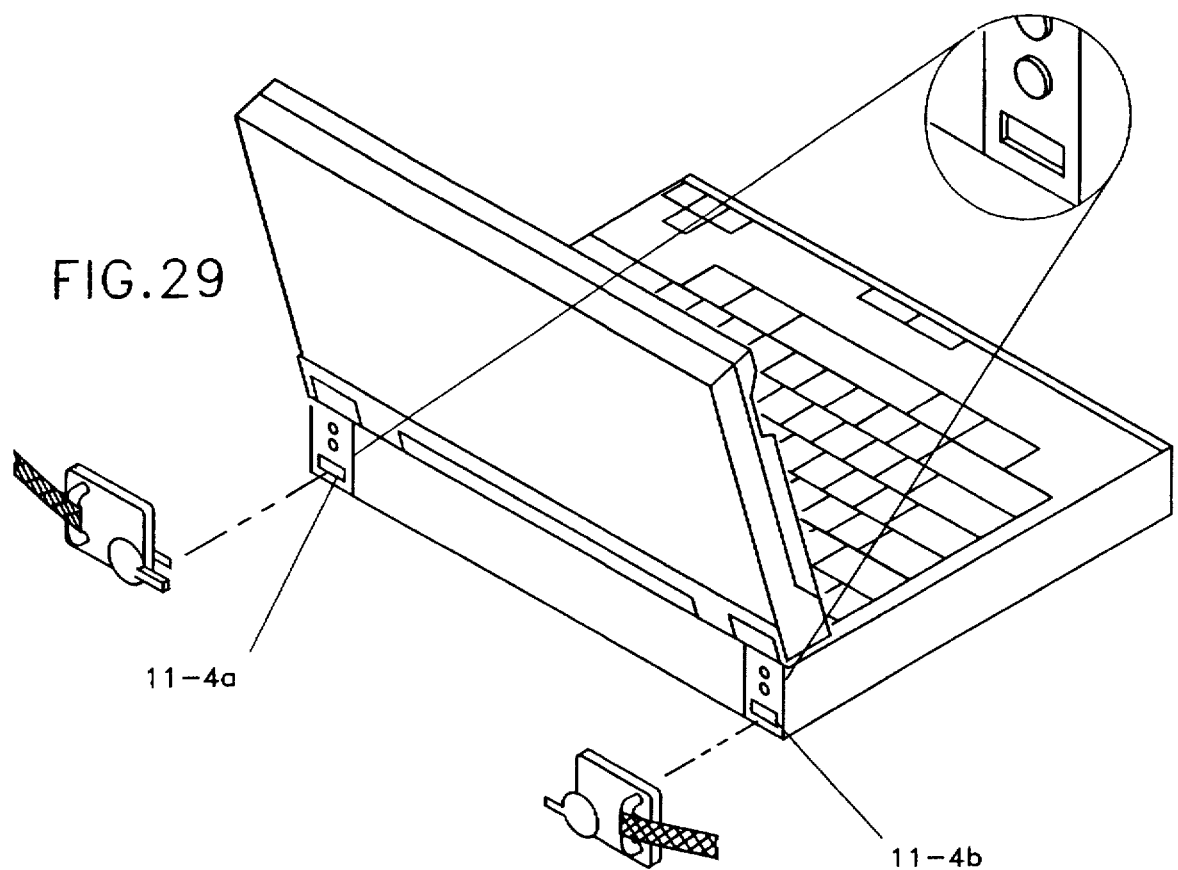
FIGS. 29 and 29A shows the attachment of the locking mechanisms 41a and 41b to the notebook computer 1.
Figure 29A:
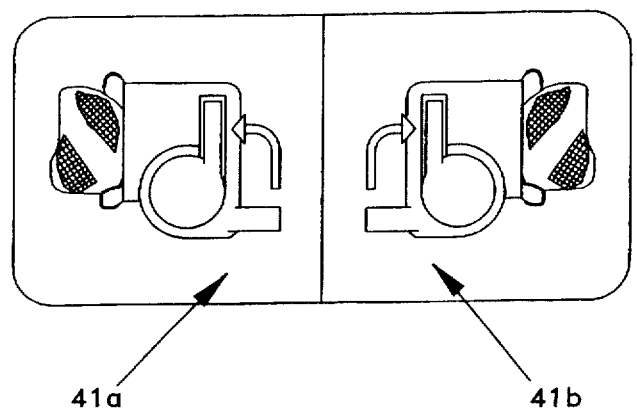

The illustrations in FIGS. 29 and 29A show the attachment of the locking mechanisms 41a and 41b of the strap 40 to the notebook computer 1. As is previously described, the small holes 11-4a and 11-4b are formed in the right and left ends of the back face of the notebook computer 1. Further, comparatively large cavities (not shown) are formed behind the small holes 11-4a and 11-4b. When the knobs 41a-1 and 41b-1 are set to their insertion positions, the protrusions 41a-4 and 41b-4 can be inserted into the small holes 11-4a and 11-4b. After the insertion, the knobs 41a-1 and 41b-1 are turned 90° to the engagement positions, so that the locking mechanisms 41a and 41b are securely fixed to the notebook computer 1 the strap 40 can also be used as a shoulder when the notebook computer 1 is being carried.

Presentations

FIG. 12 is a diagram showing the installation of the notebook computer 1 on an OHP using the stand 20. The notebook computer 1 may be positioned with the keyboard 12 directed toward the projection screen, as is shown in FIG.

12A, or with the keyboard 12 directed away from the projection screen (i.e., the audience side), as is shown in FIG. 12B. In either case, the strap 40 can adjust to the differences in shapes and sizes of various OHP's.

As is shown in FIG. 12A, when the keyboard 12 faces the projection screen, the direction in which the liquid crystal display panel 52 usually displays corresponds to that of the projection screen. Thus, as is shown in FIG. 12A, when a character "a" is displayed on the liquid crystal display panel 52 in the normal direction, the character is projected onto the screen in the correct direction.

When a presenter can not stand between the OHP and the projection screen, the keyboard 12 needs to be installed facing the audience, as is shown in FIG. 12B. In this case, the image displayed on the liquid crystal display needs to be turned 180 degree so that, it is projected onto the projection screen in the correct direction (see character "b" in FIG. 12B). The function of rotating the display contents by 180° can be implemented by using well known techniques, such as the inverse reading of a screen buffer. It would be anticipated that the installation of the notebook computer 1 as is shown in FIG. 12B would be convenient for such situations wherein the distance between the OHP and the projection screen is short due to the size of a meeting room.

When an OHP device is used, room lights are usually dimmed to make projection images clear. Thus, a presenter see will have difficulty seeing the keyboard. Therefore, the characters on the keys are printed with luminescent or fluorescent ink (not shown).

Conclusions

The present invention has been described in detail by referring to specific embodiments. It would, however, be obvious to one having ordinary skill in the art that various modifications of these embodiments would fall within the scope of the present invention. For example, although the preferred emobdimnts employ a notebook computer, another portable information processing apparatus (e.g., a word processor or another OA machine) can be used to practice the present invention. In other words, although the present invention is disclosed using the examples, it should not be limited to them.

We claim:

1. A portable information processing apparatus comprising:

a main body having a keyboard on an upper face;

a lid hinged rotatably with said main body at a rear edge of said main body, said lid including:

(i) a front lid portion in which are mounted a liquid crystal display panel, a driver for driving said liquid crystal display panel, and a backlight;

(ii) a back lid portion in which is mounted a light diffuser for diffusing light emitted by said backlight;

(iii) latching means for latching said back lid portion to said front lid portion, said latching means only being accessible to said user when said lid is in an open position, thereby inhibiting the removal of said back lid portion when said lid is closed against said main body: and (iv) switching means for detecting the removal of said back lid portion and for cutting off a drive current to said backlight in response to the removal of said back lid portion.

* * * * *